(12) United States Patent
Lee et al.

(10) Patent No.: US 11,095,414 B2
(45) Date of Patent: *Aug. 17, 2021

(54) METHOD AND APPARATUS FOR SENDING AND RECEIVING CONTROL CHANNEL IN WIRELESS COMMUNICATION SYSTEM

(71) Applicant: Samsung Electronics Co., Ltd., Suwon-si (KR)

(72) Inventors: In Ho Lee, Suwon-si (KR); Jin Kyu Han, Seoul (KR); Ju Ho Lee, Suwon-si (KR); Jae Chon Yu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/924,880

(22) Filed: Jul. 9, 2020

(65) Prior Publication Data

US 2020/0344028 A1   Oct. 29, 2020

Related U.S. Application Data

(63) Continuation of application No. 16/199,056, filed on Nov. 23, 2018, now Pat. No. 10,715,294, which is a
(Continued)

(30) Foreign Application Priority Data

Feb. 2, 2009   (KR) .......................... 10-2009-0008133

(51) Int. Cl.
*H04L 5/00*   (2006.01)
*H04W 72/04*   (2009.01)
(Continued)

(52) U.S. Cl.
CPC .......... *H04L 5/0053* (2013.01); *H04L 1/0072* (2013.01); *H04L 5/0016* (2013.01);
(Continued)

(58) Field of Classification Search
CPC ................ H04B 7/0613; H04B 7/0684; H04L 1/0057; H04L 1/0067; H04L 1/0072;
(Continued)

(56) References Cited

U.S. PATENT DOCUMENTS

| | | |
|---|---|---|
| 6,327,254 B1 | 12/2001 | Chuah |
| 6,765,969 B1 | 7/2004 | Vook et al. |
| 8,054,767 B2 | 11/2011 | Choi et al. |
| 8,249,634 B2 | 8/2012 | Ishii et al. |
| 8,526,377 B2 | 9/2013 | Lindoff et al. |

(Continued)

FOREIGN PATENT DOCUMENTS

| | | |
|---|---|---|
| KR | 10-2008-0029734 A | 4/2008 |
| KR | 10-2008-0096356 A | 10/2008 |

(Continued)

*Primary Examiner* — Yuwen Pan
*Assistant Examiner* — Paul P Tran
(74) *Attorney, Agent, or Firm* — Jefferson IP Law, LLP

(57) ABSTRACT

In a wireless communication system, a control channel is required in order to use limited resources effectively. However, the control channel resource is part of the system overhead, and thus reduces the data channel resource used for data transmission. In the long term evolution (LTE) system based on OFDM, one sub frame the consists of fourteen OFDM symbols wherein a maximum of three OFDM symbols are used for the control channel resource and remaining eleven OFDM symbols are used for the data channel resource. Therefore, the quantity of energy that can be transmitted for the control channel resource is extremely limited compared to the data channel resource. For this reason, the coverage of the control channel becomes less than that of the data channel, and even if a user can successfully receive the data channel, reception failure of a control channel sometimes results in failure of data recovery. In the present invention, in order to expand the coverage of the control channel to at least the coverage of the data
(Continued)

channel, the time resource of the transmission resource wherein the control channel is transmitted is expanded and allocated for sending and receiving the control channel. By way of methods for extending the time resource are provided a method wherein a plurality of sub frames are used to transmit one control channel, and a method wherein a part of a data channel is used for the control channel.

16 Claims, 19 Drawing Sheets

Related U.S. Application Data continuation of application No. 13/147,278, filed as application No. PCT/KR2010/000638 on Feb. 2, 2010, now Pat. No. 10,142,076.

(51) Int. Cl.
*H04L 1/00* (2006.01)
*H04W 72/12* (2009.01)

(52) U.S. Cl.
CPC ...... *H04W 72/0486* (2013.01); *H04W 72/042* (2013.01); *H04W 72/1289* (2013.01)

(58) Field of Classification Search
CPC ................. H04L 1/1812; H04L 1/1896; H04L 5/0007; H04L 5/0016; H04L 5/0037; H04L 5/0048; H04L 5/0053; H04L 5/0064; H04L 5/0091; H04L 5/14; H04L 5/16; H04L 27/2602; H04J 13/10; H04J 13/18; H04W 52/0206; H04W 52/021; H04W 52/028; H04W 52/0229; H04W 52/54; H04W 72/042; H04W 72/0406; H04W 72/0446; H04W 72/0486; H04W 72/1278; H04W 72/1284; H04W 72/1289; H04W 76/28

See application file for complete search history.

(56) References Cited

U.S. PATENT DOCUMENTS

| | | |
|---|---|---|
| 2007/0076670 A1 | 4/2007 | Kuchibhotla et al. |
| 2007/0133456 A1 | 6/2007 | Ding |
| 2008/0102846 A1 | 5/2008 | Kim et al. |
| 2008/0192622 A1 | 8/2008 | Scheim et al. |
| 2008/0259863 A1 | 10/2008 | Zhang et al. |
| 2008/0273616 A1 | 11/2008 | Papasakellariou |
| 2008/0279296 A1 | 11/2008 | Roh et al. |
| 2009/0154580 A1* | 6/2009 | Ahn ............... H04L 5/0094 375/260 |
| 2009/0154607 A1 | 6/2009 | Lindoff et al. |
| 2009/0161618 A1* | 6/2009 | Johansson ............ H04W 48/12 370/329 |
| 2009/0175186 A1 | 7/2009 | Du et al. |
| 2009/0180433 A1 | 7/2009 | Ahn et al. |
| 2009/0197630 A1 | 8/2009 | Ahn et al. |
| 2010/0027446 A1 | 2/2010 | Choi et al. |
| 2010/0067496 A1* | 3/2010 | Choi ............... H04W 52/54 370/336 |
| 2010/0111226 A1 | 5/2010 | Ko et al. |
| 2010/0115358 A1 | 5/2010 | Kotecha et al. |
| 2010/0118800 A1* | 5/2010 | Kim ............... H04L 1/0071 370/329 |
| 2010/0195566 A1 | 8/2010 | Krishnamurthy et al. |
| 2010/0208629 A1* | 8/2010 | Ahn ............... H04L 1/1887 370/280 |
| 2010/0220808 A1 | 9/2010 | Kishigami et al. |
| 2010/0290406 A1 | 11/2010 | Miki et al. |
| 2010/0309876 A1 | 12/2010 | Khandekar et al. |
| 2011/0075621 A1 | 3/2011 | Sung et al. |
| 2011/0151913 A1 | 6/2011 | Forester et al. |
| 2011/0194524 A1 | 8/2011 | Hedlund et al. |

FOREIGN PATENT DOCUMENTS

| | | |
|---|---|---|
| KR | 10-2008-0096358 A | 10/2008 |
| WO | 2008/153365 A2 | 12/2008 |
| WO | 2009/038367 A1 | 3/2009 |

\* cited by examiner

METHOD AND APPARATUS FOR SENDING AND RECEIVING CONTROL CHANNEL IN WIRELESS COMMUNICATION SYSTEM

CROSS-REFERENCE TO RELATED APPLICATION(S)

This application is a continuation application of prior application Ser. No. 16/199,056, filed on Nov. 23, 2018, which issued as U.S. Pat. No. 10,715,294 on Jul. 14, 2020; which is a continuation application of prior application Ser. No. 13/147,278, filed on Oct. 17, 2011, which issued as U.S. Pat. No. 10,142,076 on Nov. 27, 2018; which is a U.S. National Stage application under 35 U.S.C. § 371 of an International application number PCT/KR2010/000638, filed on Feb. 2, 2010, and was based on and claimed priority under 35 U. S.0 § 119(a) of a Korean patent application number 10-2009-0008133, filed on Feb. 2, 2009, in the Korean Intellectual Property Office, the disclosure of each of which is incorporated by reference herein in its entirety.

BACKGROUND

1. Field

The present invention relates to a control channel transmission/reception method and apparatus in a wireless communication system and, in particular, to a method and apparatus for transmitting/receiving downlink control channel for increasing the coverage of the control channel of a wireless communication system.

2. Description of the Related Art

Mobile communication systems are currently evolving from basic communication devices into high-speed, high-quality wireless packet data communication systems that provide data services and multimedia services beyond the early voice-oriented services. Recently, various mobile communication standards, such as High Speed Downlink Packet Access (HSDPA) and High Speed Uplink Packet Access (HSUPA), both defined by 3rd Generation Partnership Project (3GPP), High Rate Packet Data (HRPD) defined by 3rd Generation Partnership Project-2 (3GPP2), and Institute of Electrical and Electronics Engineers (IEEE) 802.16, have been developed to support the high-speed, high-quality wireless packet data services.

The existing 3rd generation wireless packet data communication system, such as HSDPA, HSUPA and HRPD, uses such technologies as an Adaptive Modulation and Coding (AMC) method and a channel-sensitive scheduling method in order to improve transmission efficiency. With the use of the AMC method, a transmitter can adjust the amount of transmission data according to the channel state. For example, when the channel state is not good, the transmitter reduces the amount of transmission data to match a reception error probability to a desired level, and when the channel state is good, the transmitter increases the amount of transmission data to efficiently transmit a large volume of information while matching the reception error probability to the desired level. Using the channel-sensitive scheduling resource management method, the transmitter, since it selectively services a user having a superior channel state among several users, can increase in the system capacity, as compared with a transmitter that allocates a channel to one user and services the user with the allocated channel. Such capacity increase is commonly referred to as a multi-user diversity gain. In brief, the AMC method and the channel-sensitive scheduling method are methods for receiving partial channel state information being fed back from a receiver, and applying an appropriate modulation and coding technique at the most efficient time determined depending on the received partial channel state information.

Recently, intensive research is being conducted to replace Code Division Multiple Access (CDMA), which is the multiple access scheme used in the 2nd and 3rd generation mobile communication systems, with Orthogonal Frequency Division Multiple Access (OFDMA) in the next generation mobile communication system. 3GPP and 3GPP2 have started standardization work on evolved systems based on OFDMA.

With the implementation of the ACM and channel-sensitive scheduling schemes, the base station is capable of allocating radio resource including frequency, timing, and power in adaptation to the user-specific channel condition. The base station notifies the user of the resource allocated in adaptation to the channel condition via Physical Downlink Control Channel (PDCCH) such that the user can be aware of the radio resource allocated to itself.

The radio resource allocations can be categorized into downlink resource allocation for the transmission from the base station to the user equipment and uplink resource allocation form the transmission from the user equipment to the base station. The downlink resource allocation is performed in adaptation to the channel condition reported by the user and the information amount of the data to be transmitted to the user, it is notified of the resource allocated to a certain user for transmitting data and modulation and coding scheme to be used for the data transmission via a control channel. The user equipment can recognize whether there is the resource allocated to itself and, if so, how to receive the data on the corresponding resource, based on the control information received on the control channel. The uplink resource allocation is performed in adaptation t the channel condition reported by the user and the information amount of the data to be transmitted and notifies the user of the resource allocated to the user and the transmission scheme to be used for the data transmission on the allocated resource. The user equipment can recognize the uplink resource allocated to itself and transmission scheme to be used for data transmission.

The information transmitted on the control channel for downlink resource allocation, i.e. Downlink Control Information, includes a User Equipment Identification (UE ID), a Down Link Resource Block (DL RB), a Transport Format (TF), and a Hybrid Automatic Repeat Request (HARQ).

The UE ID is the information transmitted for identifying whether there is the signal destined to the UE itself. Typically, a Cyclic Redundancy Check (CRC) associated with a certain UE ID is inserted to the DL control information such that if the UE decodes the DL control information successfully this means that the control information is transmitted to the UE.

If the UE decodes the DL control information successfully, the UE can locate the resource blocks on which the data destined to the UE are transmitted, based on the DL RB allocation information.

TF indicates the modulation and coding scheme of the transmitted signal. If AMC is adopted, the UE should know TF for performing the modulation and coding correctly.

HARQ is the process for the receiver to notify the transmitter of whether the transmission packet is received successfully so as to, if so, transmit the next packet and, otherwise, retransmit the lost packet. The HARQ-related information is the information whether the transmission signal is initial transmission or retransmission in HARQ process and the HARQ process number such that the UE determines whether to decode the currently received packet in combination with the previously received packet or perform new decoding operation based on the HARQ-related information.

The control information carried on the control channel for the downlink resource allocation can further include the information on multiple antenna transmission information, power control, and whether the distributed transmission is applied.

The information included in the control channel for uplink resource allocation, i.e. the control information, includes the UE ID, Uplink Resource Block (UL RB) allocation information, Transport Format (TF), and Hybrid Automatic Repeat Request (HARQ) related information.

The control information included in the control channel for uplink resource allocation can further include the information on the uplink reference signal for supporting Space Domain Multiple Access, the information on whether the distributed transmission is applied, and the information whether the channel condition report is requested.

If the control information is decoded successfully, the UE recognizes the resource blocks to be used for data transmission based on the UL RB information.

The UE should know the TF to recover the transmitted signal with the demodulation and decoding schemes requested by the base station.

The HARQ-related information has been described above.

The UE performs blind decoding of available candidate group to search for the downlink control channel destined to itself among plural downlink control channels. Here, the blind decoding is to perform decoding control channel candidates to find its own control channel without information on which control channel is used for the transmission of the control channel information when the base station has transmitted the control channel among the control channel candidates defined in a group of control channel candidates.

FIG. 1 is a diagram illustrating a control channel candidate group configuration method in the conventional wireless communication system.

In FIG. 1, Control Channel Element (CCE) is a unit of logical channel constituting the control channel. CCE corresponds to a group of Resource Elements (RE) as a unit of physical channel.

How many CCEs constitute a control channel is referred to as Aggregation Level (AL). If a control channel is composed of N CCEs, AL is N; and FIG. 1 is depicted in consideration of examples of AL=1 111, AL=2 112, AL=4 113, and AL=8 114.

In the exemplary case of FIG. 1, it is assumed that the control channel uses one modulation scheme. In this case, as AL increases, a number of coded bits decreases. This means that the code rate of the control channel decreases. That is, the lower AL is, the fewer the resource for transmission of the control information is; however, the UE can receive the control information successfully under good channel condition. As AL increases, the more resources are used, but, in such as case, even the user equipment experiencing bad channel condition can successfully receive the control information. In order to improve resource usage efficiency, it is preferred to configure the control channel with low AL for the user equipment having good channel condition and with high AL for the user equipment having bad channel condition.

A number of information bits constituting the control information (DCI) can be changed depending on the type of the control information. For example, the number of bits can be increased to increase degree of freedom or decreased with the cost of reduction of degree of freedom for indicating the resource block allocation information. The number of bits of the control information can be changed according to the information to be added. In case that the control information changes in length due to different numbers of bits, the lengths of the control information can be discriminated by DCI format. Since the user equipment does not know which DCI format is used for transmitting the control information, blind decoding is applied. Although transmitted in the same channel condition, it is preferred to transmit the control channel carrying the control information in DCI format of a large number of bits with a high AL as compared to the control channel carrying the control information in DCI format of a small number of bits.

Referring to FIG. 1, 8 CCEs 100 to 107 are given. This is just for the convenience sake, but a number of CCEs can be changed at any time. The number of CCEs can be influenced by constant values such as downlink system bandwidth, a number of base station transmit antennas, and a number of downlink ACK/NACK channels for supporting uplink HARQ, and the control region information in which the values change every subframe as unit of time for scheduling.

In the exemplary case of FIG. 1, there are the control channel candidates 120 to 127 corresponding to AL=1 as denoted by reference number 111. Reference number 120 denotes the control channel configured with a CCE 0 100, and reference number 127 denotes the control channel configured with a CCE 7 107. There are control channel candidates 128 and 129 corresponding to AL=2 as denoted by reference number 112. Reference number 128 denotes the control channel configured with CCE 0 100 and CCE 1 101. There is the control channel candidate 132 corresponding to AL=4 as denoted by reference number 113. Reference number 132 denotes the control channel configured with CCE 0 101 to CCE 3 103. There is the control channel candidate 134 corresponding to AL=8 as denoted by reference number 114, and reference number 134 denotes the control channel configured with 8 CCEs of CCE 0 100 to CCE 7 107.

The method for configuring the control channel candidate per AL in FIG. 1 is based on the tree structure. The control channel candidates of AL=2 includes a set of control channel candidates corresponding to AL=1, the control channel candidates of AL=4 include a set of control channel candidates corresponding to AL=2, and the control channel candidates of AL=8 include a set of control channel candidates corresponding to AL=4.

For example, reference number 132 is PDCCH composed of 4 CCEs 0 to 3 corresponding to the control channel candidate 128 including a set of CCEs 0 and 1 and the control channel candidate 129 including a set of CCEs 2 and 3 at AL=2. According to such a tree structure, when the total number of CCEs is N_CCE, a number of control channels that can be configured at an AL is floor(N_CCE/AL). Here, floor(x) is the floor function expressing the maximum integer equal to or less than x.

FIG. 2 is a diagram illustrating a structure of a downlink subframe in a conventional OFDM-based Long Term Evolution (LTE) system.

In FIG. 2, a subframe is composed of 14 OFDM symbols 200 to 213, the three OFDM symbols 200 to 202 at the beginning of the subframe are assigned for the control channel (PDCCH), and the rest OFDM symbols 203 to 213 assigned for the data channel (Physical Downlink Data Channel (PDDCH)). The control channel region is positioned at the beginning of the subframe such that the UE can check whether the subframe carries no data destined to itself and, if so, enters micro sleep mode to reduce power consumption in the data channel region.

In case that the same amount of bit information is transmitted in the control channel and the data channel in the subframe structure as shown in FIG. 2, the energy per bit on the control channel is less than that on the data channel at the limited transmit power. This is because the resource allocated for the control channel is less than the resource allocated for the data channel in time domain such that the more frequency resource is used for control channel as compared to the data channel in the same OFDM symbol and thus the energy amount per bit decreases in the limited transmit power. After all, this means that the actual coverage of the transmitted signal of the control channel is less that of the data channel. Accordingly, although the data channel is received successfully, the user terminal may fail to receive the control channel, resulting in failure of data channel decoding. There is therefore a need of a method for increasing the coverage of the control channel to become larger than that of the data channel to overcome the aforementioned problem.

SUMMARY

Problem to be Solved

In order to solve the above problems, it is an objective of the present invention to provide a control channel transmission/reception method and apparatus that is cable of increasing the coverage of the control channel by increasing the resource amount in time domain when transmitting the control channel.

Means for Solving the Problem

In order to achieve the above objective, a control channel transmission method of a base station in a wireless communication system according to a preferred embodiment of the present invention includes steps of generating control information for a terminal scheduled, generating a control channel having the control information, and transmitting the control channel through transmission resource of time resource longer than the time resource of a control channel region of a subframe.

In order to achieve the above objective, a control channel reception method of a terminal in a wireless communication system according to a preferred embodiment of the present invention includes steps of receiving at least one subframe having a control channel mapped to transmission resource of time resource longer than the time resource or control channel region of a subframe, extracting the control channel and control information from the at least one subframe through a blind decoding method, and transmitting/receiving data through the transmission resource indicated by the control information.

In order to achieve the above objective, a control channel transmission apparatus of a base station in a wireless communication system according to a preferred embodiment of the present invention includes a control information generator which generates control information of a terminal scheduled; a CCE mapper which maps a control channel having the control information to transmission resource; a controller which controls the CCE mapper to maps the control channel to the transmission resource of time resource longer than the time resource or control channel region of a subframe; and a transmitter which transmits the control information through the allocated transmission resource.

In order to achieve the above objective, a control channel reception apparatus of a terminal in a wireless communication system according to a preferred embodiment of the present invention includes a receiver which receives at least one subframe having a control channel mapped to transmission resource of time resource longer than the time resource or control channel region of a subframe; a CCE de-mapper which de-maps the control channel from the at least one subframe according to the transmission resource; a control channel decoder/demodulator which perform blind decoding on the control channel; a controller which recognizes data channel allocated to the terminal by referencing the control information of the control channel; and a data channel decoder/demodulator which decodes the data channel under the control of the controller.

Advantageous Effects

The method and apparatus according to an embodiment of the present invention is capable of obtain high energy using the additional time domain resource for transmitting a control channel so as to increases the coverage of the control channel. Accordingly, it is possible to avoid data channel decoding failure caused by the control channel reception failure, resulting in reduction of probability of outage.

DETAILED DESCRIPTION OF EXEMPLARY EMBODIMENTS

Figure 1:
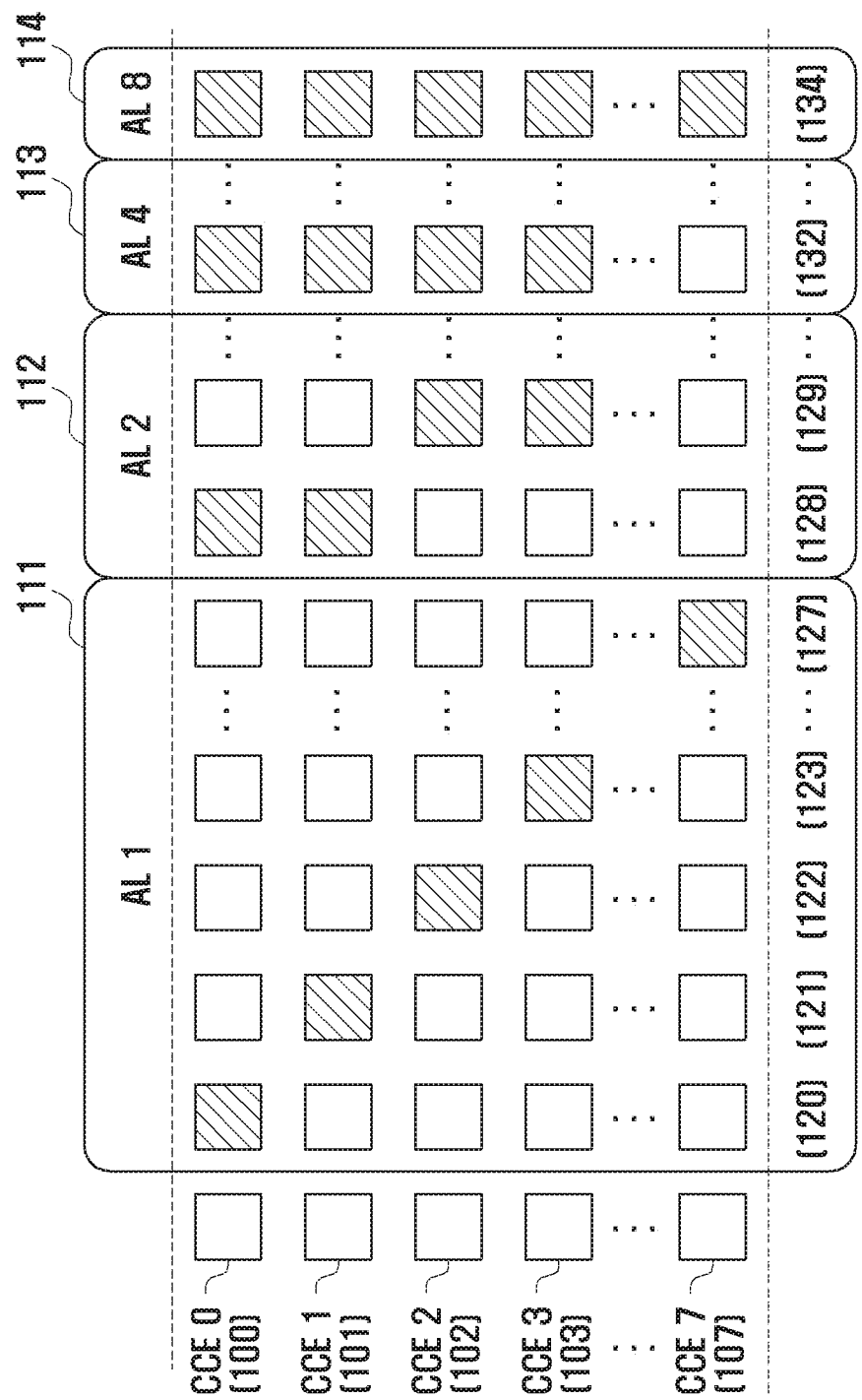
FIG. 1 is a diagram illustrating a control channel candidate group configuration method in the conventional wireless communication system.
Figure 2:
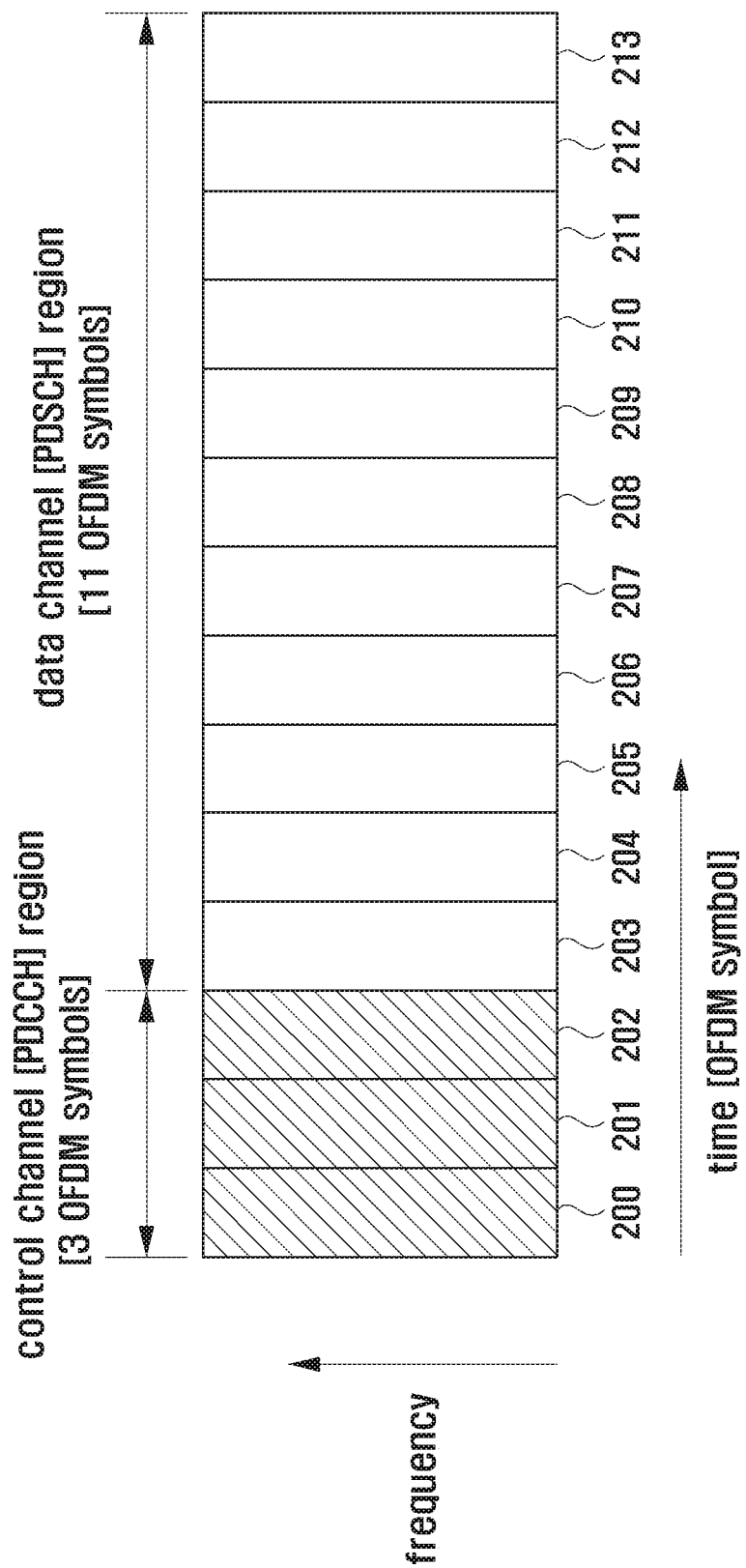
FIG. 2 is a diagram illustrating a structure of a downlink subframe in a conventional OFDM-based Long Term Evolution (LTE) system.

Detailed description of well-known functions and structures incorporated herein may be omitted to avoid obscuring the subject matter of the present invention. Exemplary embodiments of the present invention are described with reference to the accompanying drawings in detail.

The transmission resources include time resource and frequency resource. For example, the unit of the time resource can be OFDM symbol, and the unit of the frequency resource can be subcarrier (or tone).

The present invention is to increase the coverage of the control channel transmitted to a certain user equipment. For this purpose, the more time resource is assigned for the transmission of the control channel as compared to the conventional control channel transmission. As a result, the energy per bit in transmit power increases so as to extend the actual cell coverage of the control channel transmission.

That is, the present invention uses additional time resource to transmit the control channel for a certain user equipment. In order to increase the amount of time resource for control channel, it is proposed first to use the control channel resource of multiple subframes and second to borrow the data channel resource in the one subframe.

Here, the control channel resource is Packet Data Control Channel (PDCCH) region, and the data channel resource is Physical Downlink Shared Channel (PDSCH) region. The user equipment can discriminate the control channel and data channel regions by receiving PCFICH. PCFICH is the physical channel for transmitting Control Channel Format Indicator (CCFI) information. CCFI is the information composed of 2 bits indicating the control channel allocation indicator, i.e. "L." The user equipment should receive the CCFI first to know a number of symbols allocated for the control channel, such that the PCFICH should be received first in the subframe by all the user equipments except for the fixedly allocated downlink resource. The control channel region is the region determined by a number of symbols which the base station informs to the user equipment by means of PCFICH in the downlink frame, and the rest region becomes the data region.

Typically, the control channel for a certain user equipment is transmitted in the control channel region of a subframe. As aforementioned, the control channel region uses up to 3 symbols at the beginning of a subframe in time domain. In an embodiment of the present invention, the time resource allocated for the control channel is extended such that the control channel is transmitted on the transmission resource having the extended time resource. According to an embodiment of the present invention, the region on which the control channels are transmitted can be distributed to the control channel regions of a plurality of subframes or across the control channel and data channel regions or formed in the data channel region.

In order to transmit the control information using the transmission resource extended in time resource, two methods are proposed, i.e. first to increase the maximum Aggregation Level (AL) and second to repeat the conventional control channel candidate group according to the extended time resource.

The information used for transmitting a control channel signal required for use of the additional time domain resource can include a number of subframes, control channel candidates group of increased AL, and information on the data channel region allocated in advance for control channel transmission. Such information can be shared by a certain user equipment and base station via higher layer signaling. For example, the higher layer signaling can be the system information, i.e. SIB1.

Figure 3:
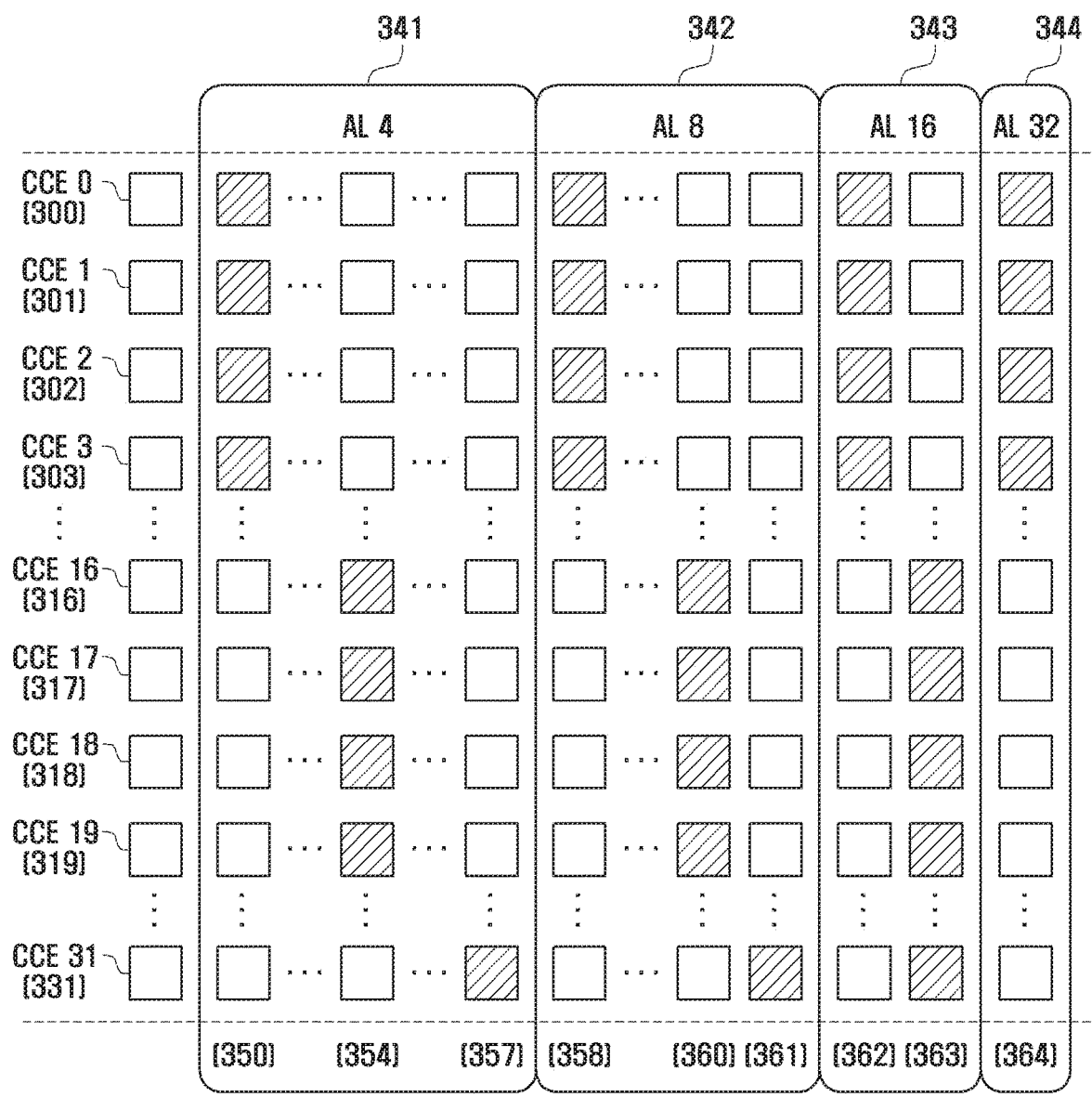
FIG. 3 is a diagram illustrating a control channel candidate group configuration method as control channel signal according to an embodiment of the present invention.

FIG. 3 is a diagram illustrating a control channel candidate group configuration method as control channel signal according to an embodiment of the present invention.

Referring to FIG. 3, the AL of the extended control channel candidate group can increase by square of 2. Accordingly, the maximum AL of the extended channel candidate group can be determined according to the resource amount of the added time region. That is, the maximum AL can be determined according to the number of subframes in the method using the control channel resources of multiple subframes and the available data channel resource amount in the method using the data channel resource in the same subframe.

The extended channel candidate group to be transmitted as the control channel signal can be used across the control channel region and the additional time region in the above two methods.

Suppose a case where a control channel is transmitted across two subframe, AL=4 as denoted by reference number 341, and CCEs 16 to 19 denoted by reference numbers 316 to 319. In this case, CCE 16 316 and CCE 17 317 can be transmitted in the first subframe while CCE 18 318 and CCE 19 319 are transmitted in the second subframe.

A description is made of the method for transmitting a control channel for a certain user equipment using the control channel resource of plural subframes according to an embodiment of the present invention. This includes the first method transmitting the conventional control channel candidates repeatedly in the plural subframes and the second method transmitting the extended control channel candidates across the plural subframes. In the method for transmitting the control channel using the plural subframes, the data channel is transmitted in the last subframe among the plural subframes.

First Embodiment: Transmit the Control Channel in the Control Channel Regions of Plural Subframes Repeatedly FIG. 4 is a diagram illustrating a method for transmitting the control channel repeatedly in the control channel regions of plural subframes according to an embodiment of the present invention.

Figure 4:
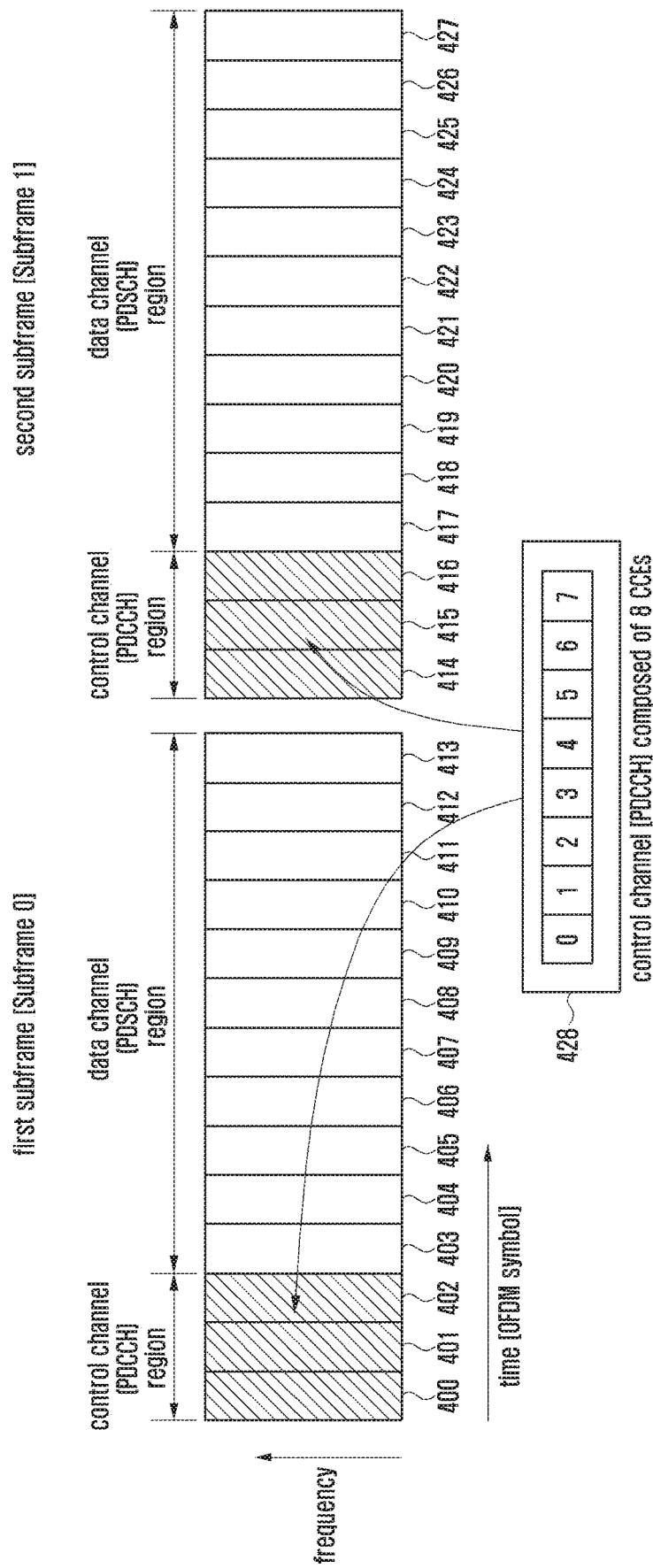
FIG. 4 is a diagram illustrating a method for transmitting the control channel repeatedly in the control channel regions of plural subframes according to an embodiment of the present invention.

In FIG. 4 two subframes (subframe0, subframe1) are depicted. The base station transmits the control channel (PDCCH) 428 in the control channel regions of the individual subframes repeatedly. Here, the control channel is composed of 8 CCEs. That is, the control channel 428 is transmitted on a part of the 3 OFDM symbols 400 to 402 at the beginning of the first subframe (subframe0) and on a part of the 3 OFDM symbols 414 to 416 at the beginning of the second subframe (subframe1) again.

A number of subframes used for transmitting the designation information of certain user equipments receiving the control channel and the number of subframes used for transmitting a control channel with this method is notified to the user equipment receiving such control channel via higher layer signaling. In the example of FIG. 4, the number of subframes used for transmitting one control channel and the number of CCEs constituting the control channel can be changed.

Figure 5:
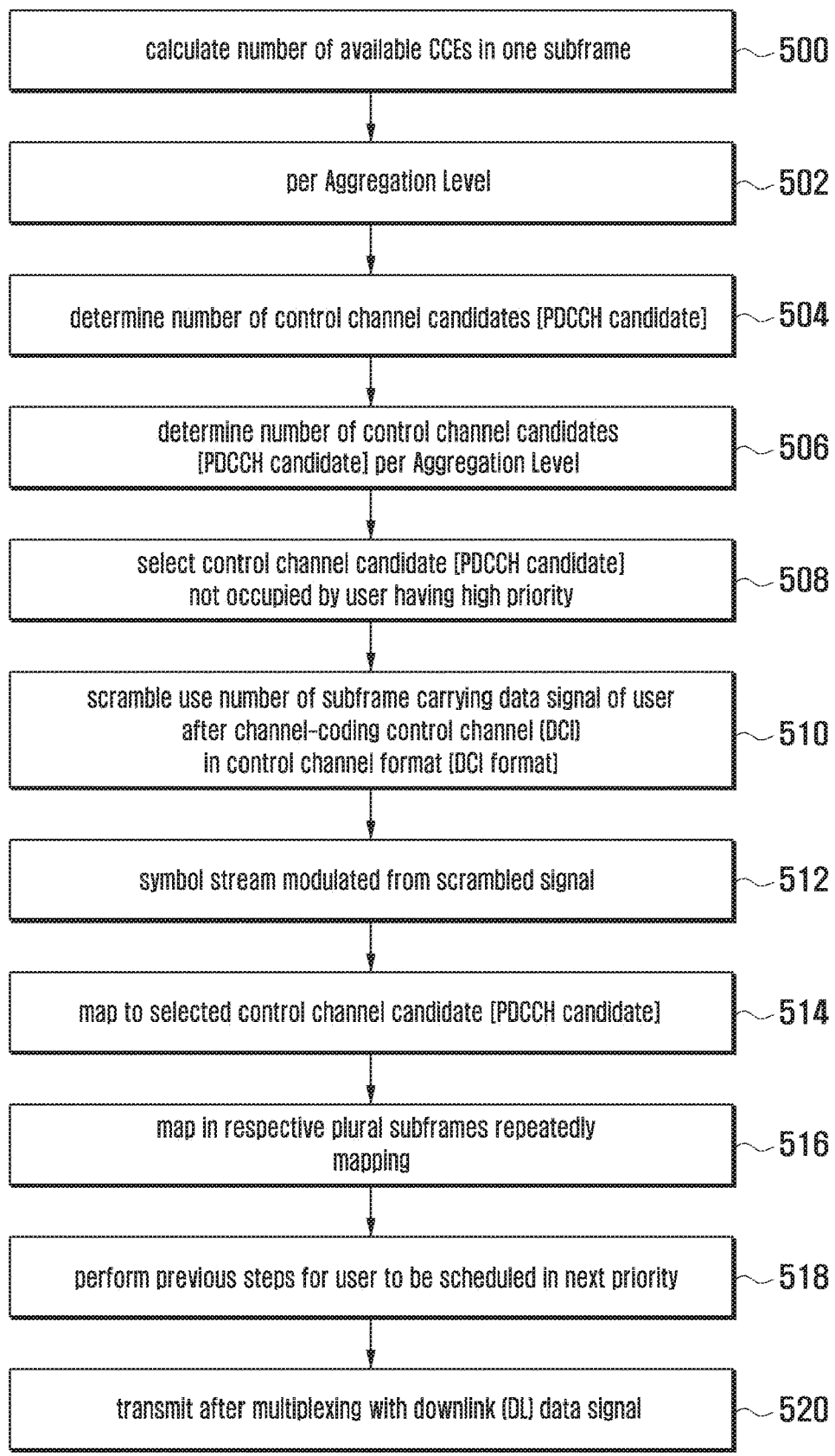
FIG. 5 is a flowchart illustrating a method for transmitting the control channel repeatedly in the control channel regions of plural subframes according to an embodiment of the present invention.

FIG. 5 is a flowchart illustrating a method for transmitting the control channel repeatedly in the control channel regions of plural subframes according to an embodiment of the present invention.

Referring to FIG. 5, the base station determines priorities of the users to be scheduled at step 500. Next, the base station determines the control information (DCI) and control information format (DCI format) of the users to be scheduled in order of priority at step 502. Next, the base station calculates a number of CCEs available in the corresponding subframe at step 504. The number of available CCEs is determined based on the constant value such as the downlink system bandwidth, a number of base station transmit antennas, a number of downlink ACK/NACK channels for supporting uplink HARQ, and the control region information of which value varies in every subframe as time unit of scheduling.

Afterward, the base station determines a number of control channel candidates per AL at step 506. Once the number of control channel candidates are determined, the base station determines the control channel candidates group by applying the determined value to a hash function at step 508.

Next, the base station selects the control channel candidate which is not occupied by the user (user equipment) having the highest priority at step 510. The base station determines the selected control channel candidate as the control channel candidate of the corresponding user. Next, the base station performs channel coding on the control information (DCI) determined (at step 502) suitable for the DCI format and performs scrambling on the control information with the index of the subframe in which the user data is transmitted at step 512. For example, referring to FIG. 4, since the control channel is transmitted in the first subframe (subframe0) and the second subframe (subframe1), the control information is scrambled with the identifier of the second subframe (subframe1). This means that, when the control channel is transmitted in at least two subframes, the control information is scrambled using the identity number of the last subframe. This method of scrambling the control information using the index of the subframe to transmit data can prevent the user equipment from decoding the control channel successfully due to the error occurred before the last subframe carrying the data among the plural subframes carrying the control channel.

Next, the base station modulates the symbols of the scrambled control information and maps the modulated symbol stream to the selected control channel.

The base station maps the control channel to the control channel regions of a predetermined number of subframes at step 516. For example, referring to FIG. 4, the symbol stream constituting the control channel (PDCCH) 428 composed of 8 CCEs is mapped is mapped to the control channel regions (PDCCH regions) of the two subframes (subframe0, subframe1), repeatedly.

Next, the base station repeats steps 504 to 516 for the user to be scheduled in the next priority to map the control channel of the users to be scheduled at step 518. The base station transmits the control channel after multiplexing with the downlink data signal.

Figure 6:
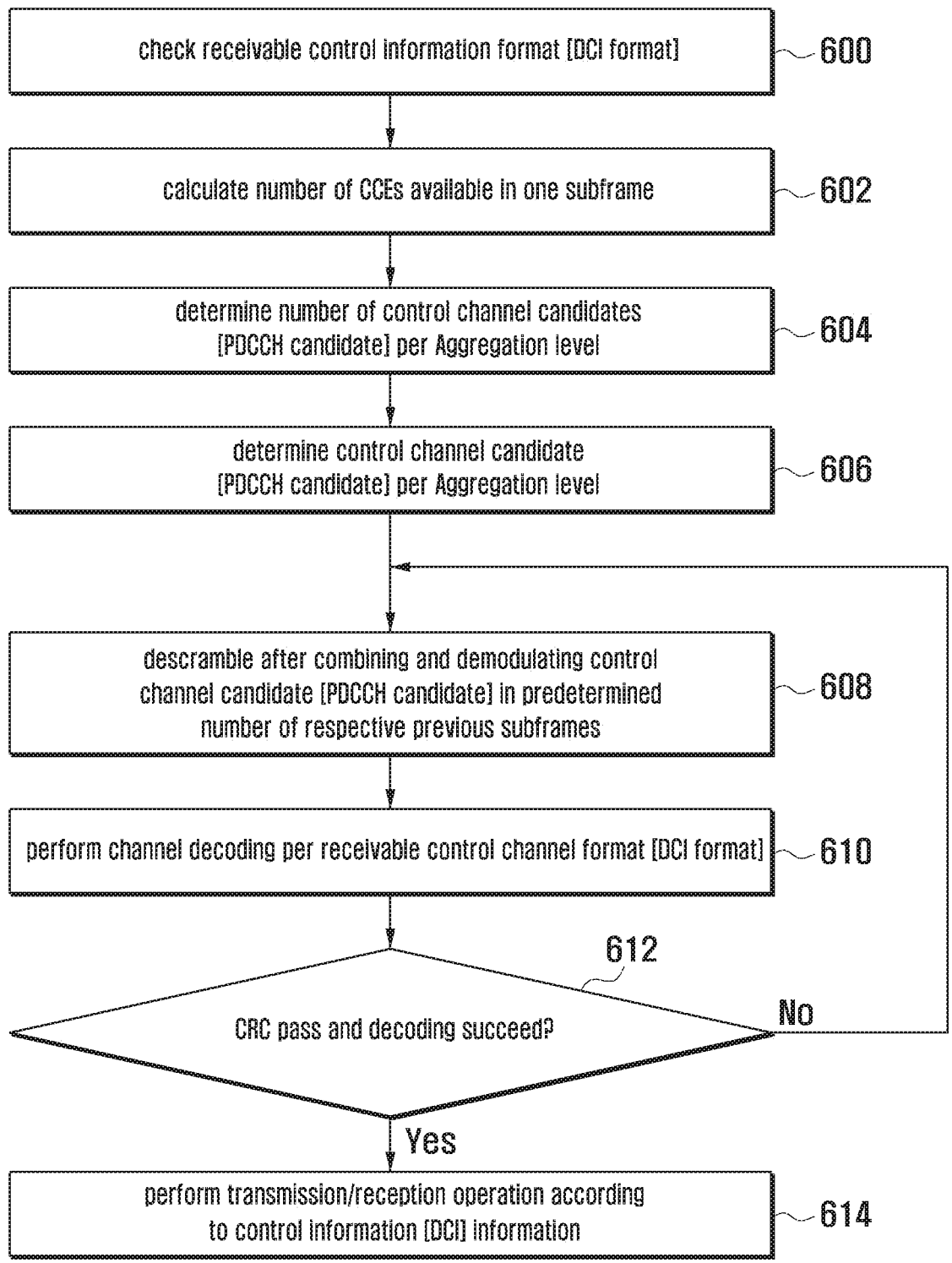
FIG. 6 is a flowchart illustrating a method for receiving the control channel transmitted repeatedly in plural subframes according to an embodiment of the present invention.

A description is made of the method for receiving control channel transmitted repeatedly in the plural subframes according to the aforementioned method. FIG. 6 is a flowchart illustrating a method for receiving the control channel transmitted repeatedly in plural subframes according to an embodiment of the present invention.

If a signal is received from the base station, the user equipment checks the control information format receivable at step 600 and calculates the number of available CCEs. As aforementioned, the receivable control information format is preset via the higher layer signaling. As shown in the transmission method of the base station that is described with reference to FIG. 5, the number of available CCEs is determined based on the constant value such as the downlink system bandwidth, a number of base station transmit antennas, a number of downlink ACK/NACK channels for supporting uplink HARQ, and the control region information of which value varies in every subframe as time unit of scheduling, such that the user terminal should know all these values.

Next, the user equipment determines a number of the control channel candidates per AL at step 604 and determines the control channel candidates group per AL by applying the previously determined values (the number of control channel candidates) to the hash function at step 606.

The user equipment combines the predetermined plural subframes per control channel candidate and performs descrambling with the corresponding subframe number. Here, the corresponding subframe number is the number of the subframe carrying the control channel including the control information of the user equipment itself. For example, referring to FIG. 4, since the control channel is transmitted in the first subframe (subframe0) and the second subframe (subframe1), the user equipment performs descrambling on the control channel with the identifier of the second subframe (subframe1). This means that, when the control channel is transmitted in at least two subframes, the descrambling is performed with the identity number of the last subframe.

Next, the base station performs channel decoding per receivable control information format at step 610. Next, the user equipment performs CRC test to determine whether the control channel is decoded successfully at step 612. If it is determined that the control channel decoding is failed, the user equipment repeats steps 608 and 610 to other control channel candidates acquired through step 606. If the control channel decoding has failed for all the control channel candidates, this means that there is no control channel transmitted to the corresponding user. Otherwise, if the control channel decoding is successful at step 612, the user equipment locates the transmission resource allocate to itself according to the control information (DCI) received through the control channel decoded successfully (passed the CRC test) and performs transmission/reception operation using the transmission resource allocate to itself at step 614.

Second Embodiment: Control Channel Transmission Using Control Channel candidates Extended Over the Control Channel Regions of Plural Subframes FIG. 7 is a diagram illustrating a method for transmitting a control channel using the control channel candidates distributed over the control channel regions of plural subframes according to an embodiment of the present invention.

Figure 7:
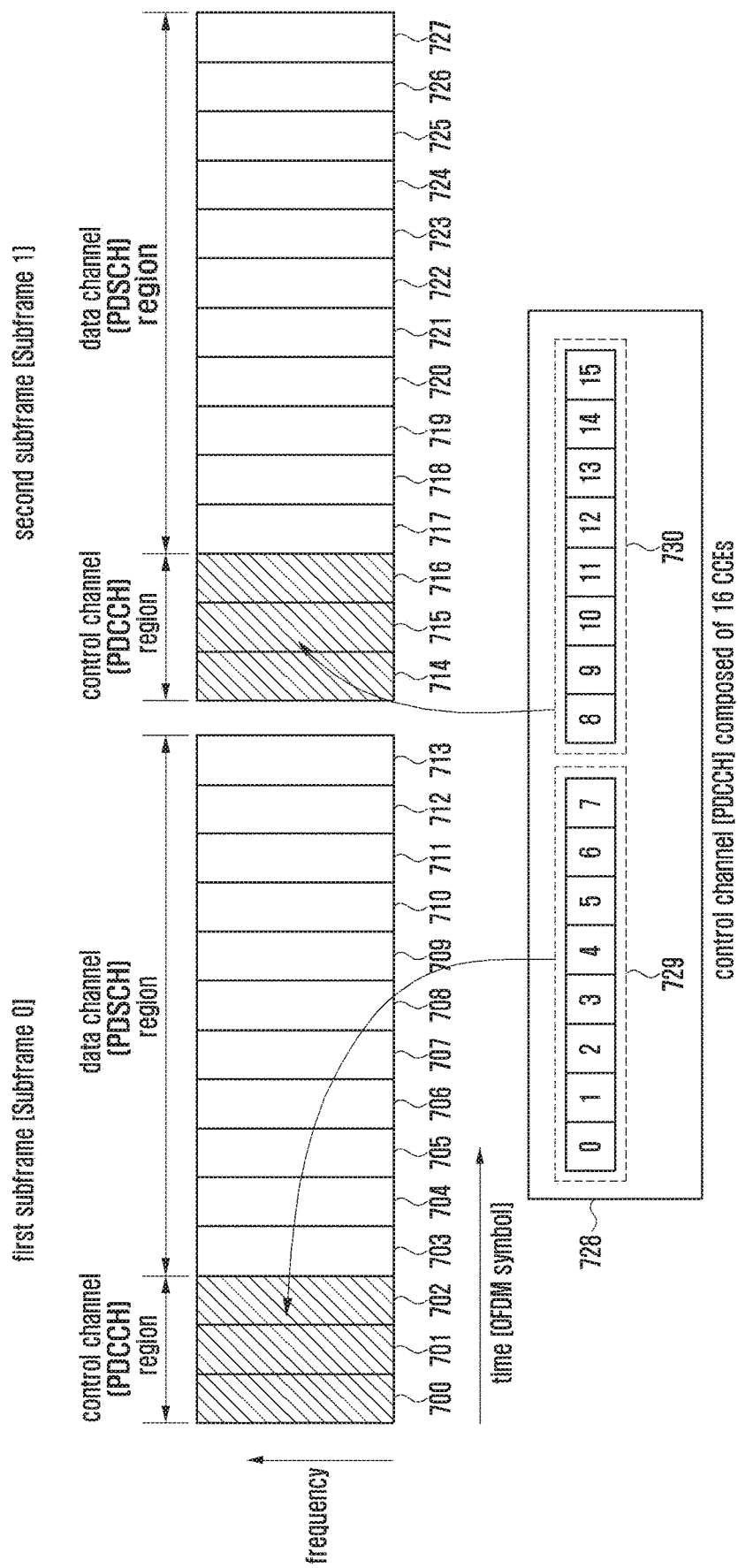
FIG. 7 is a diagram illustrating a method for transmitting a control channel using the control channel candidates distributed over the control channel regions of plural subframes according to an embodiment of the present invention.

In FIG. 7, two subframes (subframe0, subframe1) are depicted. The base station transmits the extended control channel in the subframes in divided manner. Here, the extended control channel is composed of 16 CCEs. That is, the first 8 CCEs 729 of the extended control channel 728 carries a part of the three OFDM symbols 700 to 702 placed at the beginning of the first subframe (subframe0), and the last 8 CCEs 730 of the extended control channel 728 carries a part of the three OFDM symbols 714 to 716 at the beginning of the second subframe (subframe1).

The base station notifies the corresponding user equipment with the designation information of specific user equipment receiving the control channel using the above described method, information on the extended control channel candidate group, and the number of subframes used for transmitting the extended control channel via higher layer signaling. In FIG. 7, the number of subframes used for transmitting an extended control channel and the number of CCEs constituting the control channel can be changed.

Figure 8:
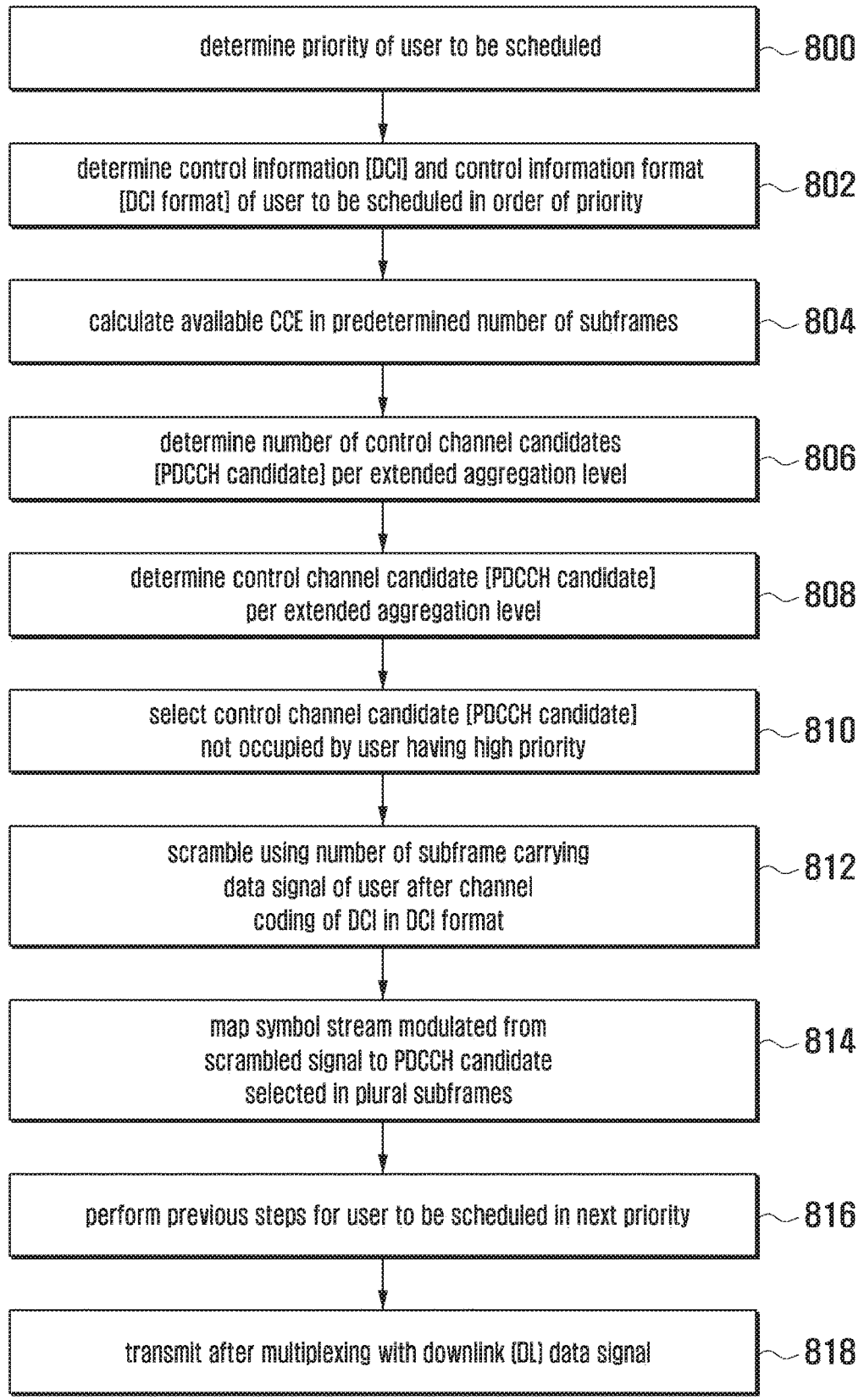
FIG. 8 is a flowchart illustrating a method for transmitting the control channel using the control channel candidates group extended over the control channel regions of plural subframes according to an embodiment of the present invention.

FIG. 8 is a flowchart illustrating a method for transmitting the control channel using the control channel candidates group extended over the control channel regions of plural subframes according to an embodiment of the present invention.

Referring to FIG. 8, the base station determines the priority of the user to be scheduled at step 800 and then determines the control information and the control information format for the user to be scheduled in order of priority at step 802.

In order to transmit the control channel using plural subframes as proposed in the present invention, the base station calculates a number of the CCEs available in the plural subframes determined in advance by higher layer signaling at step 804 and determines a number of control channel candidates per extended AL at step 806. At this time, the maximum AL is determined based on the predetermined number of subframes. Next, the base station determines extended control channel candidates group by applying the predetermined number of candidates (at step 806) to the hash function at step 808.

The base statin selects the control channel candidate which is not preoccupied by the user (equipment) having higher priority at step 810. That is, the base station determines the selected control channel candidate as the control channel candidate of the corresponding user.

Next, the base station performs channel encoding on the control information into the control information format and performs scrambling on the control information using the number of subframe carrying the data signal of the user at step 812, as step 512 of FIG. 5. For example, referring to FIG. 7, since the extended control channel is transmitted as distributed in the first subframe (subframe0) and the second subframe (subframe1), the control information is scrambled with the identifier of the second subframe (subframe1). This means that, when the control channel is transmitted in at least two subframes, the control information is scrambled using the identity number of the last subframe. This method of scrambling the control information using the index of the subframe to transmit data can prevent the user equipment from decoding the control channel successfully due to the error occurred before the last subframe carrying the data among the plural subframes carrying the control channel.

Next, the base station modulates the scrambled signal and maps the modulated symbol stream to the control channel regions of the plural subframes. For example, referring to FIG. 7, the symbol stream constituting the control channel composed of 16 CCEs are mapped in unit of 8 CCEs for the respective subframes (subframe0, subframe1).

Next, the base station repeats steps 804 to 814 for the user to be scheduled in the order of next priority until the control channels of all the users to be scheduled are mapped at step 816. Next, the base station transmits the control channel as multiplexed with the downlink data signal.

Figure 9:
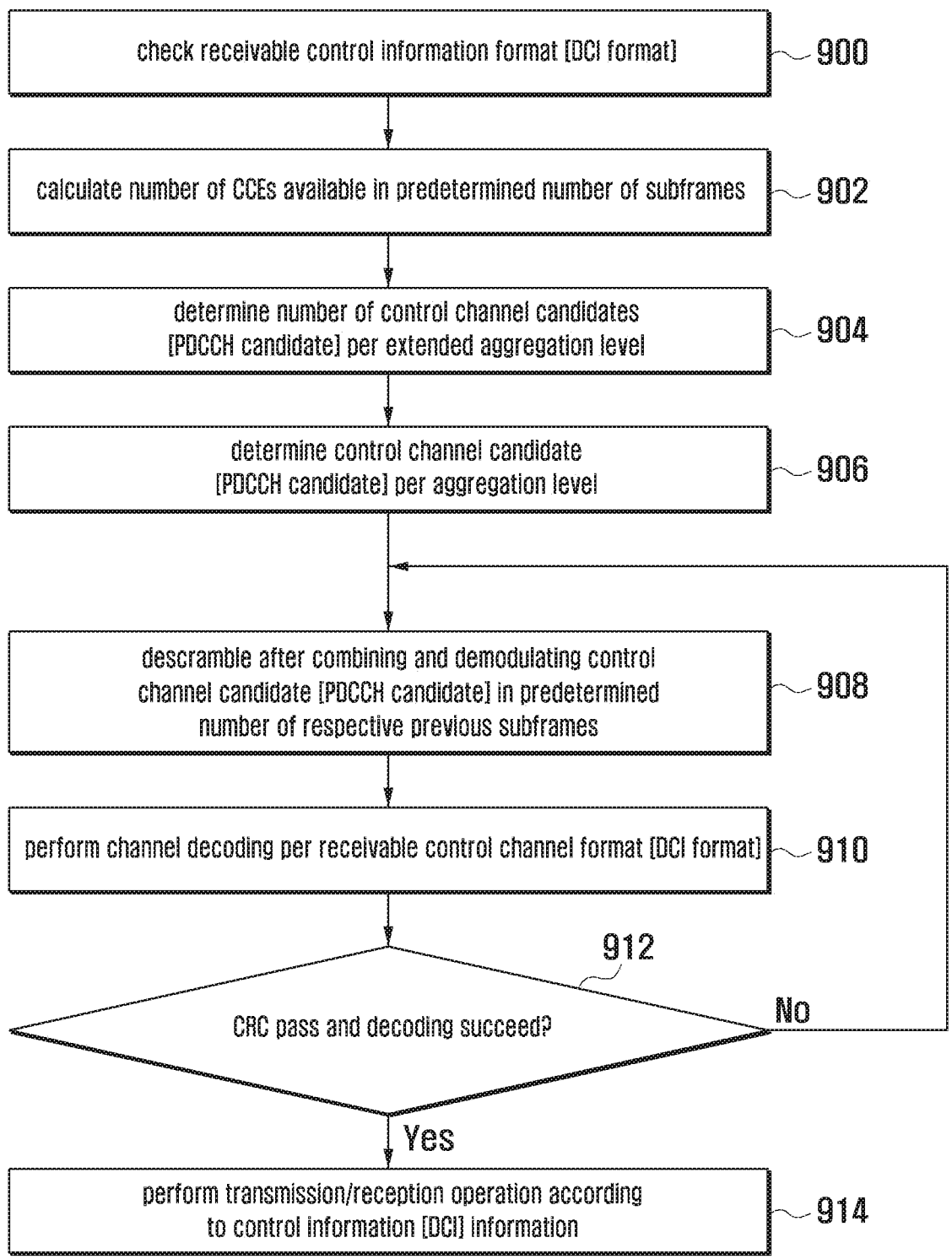
FIG. 9 is a flowchart illustrating a method for receiving the control channel using the control channel candidates group distributed over plural subframes according to an exemplary embodiment of the present invention.

A description is made of the method for receiving the control channel distributed over plural subframes as described above. FIG. 9 is a flowchart illustrating a method for receiving the control channel using the control channel candidates group distributed over plural subframes according to an exemplary embodiment of the present invention.

Referring to FIG. 9, the user equipment checks the receivable control information formats at step 900. The receivable control information formats are preset via higher layer signaling. The user equipment calculates a number of the CCEs of the predetermined number of plural subframes at step 902 and determines the number of control channel candidates per extended AL at step 904. Next, the user equipment determines the control channel candidates group per extended AL by applying the value (number of control channel candidates) to the hash function.

Next, the user equipment performs demodulation on individual control channel candidates for the predetermined number of previous subframes and performs descrambling with the corresponding subframe numbers as the method for receiving base station transmission proposed in FIG. 8 according to the present invention, at step 908. For example, referring to FIG. 7, since the control channels are transmitted in the first subframe (subframe0) and the second subframe (subframe1), the control information is descrambled with the identifier of the second subframe (subframe1). This means that, when the control channel is transmitted in at least two subframes, the descrambling is performed with the identity number of the last subframe.

The user equipment performs channel decoding on the individual receivable control information formats. The user equipment performs CRC to determine whether the control channel is decoded successfully at step 912. If the CRC fails, the user equipment repeats steps 908 to 910 on other remained control channel candidates. If the decoding attempts on all of the control channel candidates have failed, this means that there is no control channel transmitted to the corresponding user. If the control channel decoding is successful at step 912, the user equipment locates the transmission resource allocated to itself based on the control information received through the successfully decoded control channel (successful CRC test result) and performs transmission/reception operation on the transmission resource allocate to itself at step 914.

In the present invention, two methods are proposed for transmitting a control channel for a specific user equipment with a part of the data channel resource. The first method is to transmit/receive the control channel in a predetermined data channel region without using the control channel, and the second method is to transmit/receive the extended control channel candidates in the convention control channel region and a part of the data channel region.

Third Embodiment: Control Channel Transmission Using a Part of Data Channel Region FIG. 10 is a diagram illustrating a method for transmitting/receiving control channel signal using a part of the data channel region of a subframe according to an embodiment of the present invention.

Figure 10:
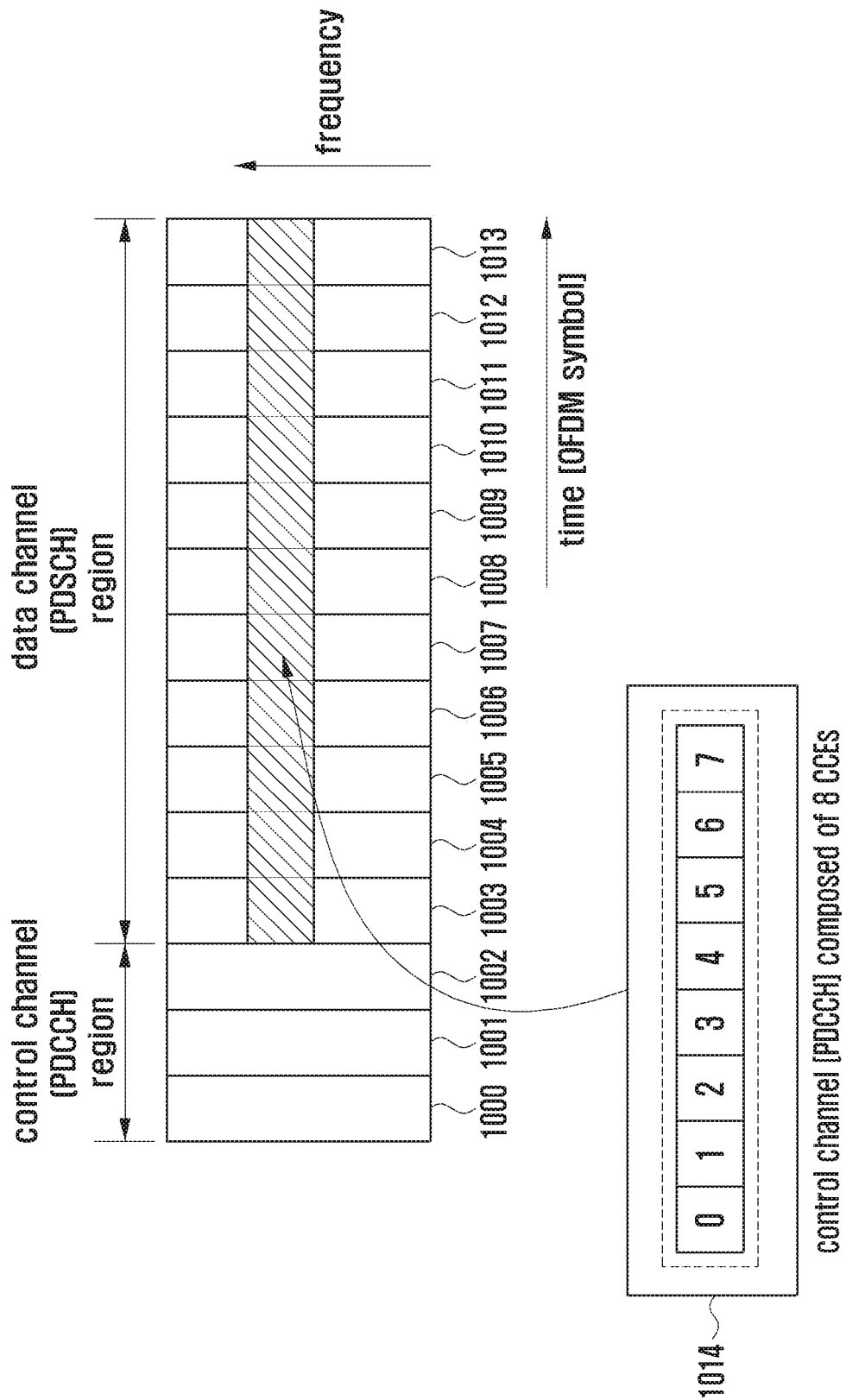
FIG. 10 is a diagram illustrating a method for transmitting/receiving control channel signal using a part of the data channel region of a subframe according to an embodiment of the present invention.

In FIG. 10, the downlink subframe includes the control channel region composed of three symbols 1000 to 1002 at the beginning of the subframe and the data region composed of the rest 11 symbols 1003 to 1013.

According to an embodiment of the present invention, the base station can transmit the control channel 1014 in the data channel region 1003 to 1013 but not the control channel region 1000 to 1002 so as to increase the transmission resource in time domain as compared to the case using the control channel region. Here, the control channel 1014 is composed of 8 CCEs.

The base station notifies the corresponding user equipment with the designation information of specific user equipments receiving the control channel using the above described method, information on the extended control channel candidate group, and the number of subframes used for transmitting the extended control channel via higher layer signaling. In FIG. 10, the number of subframes used for transmitting an extended control channel and the number of CCEs constituting the control channel can be changed.

Figure 11:
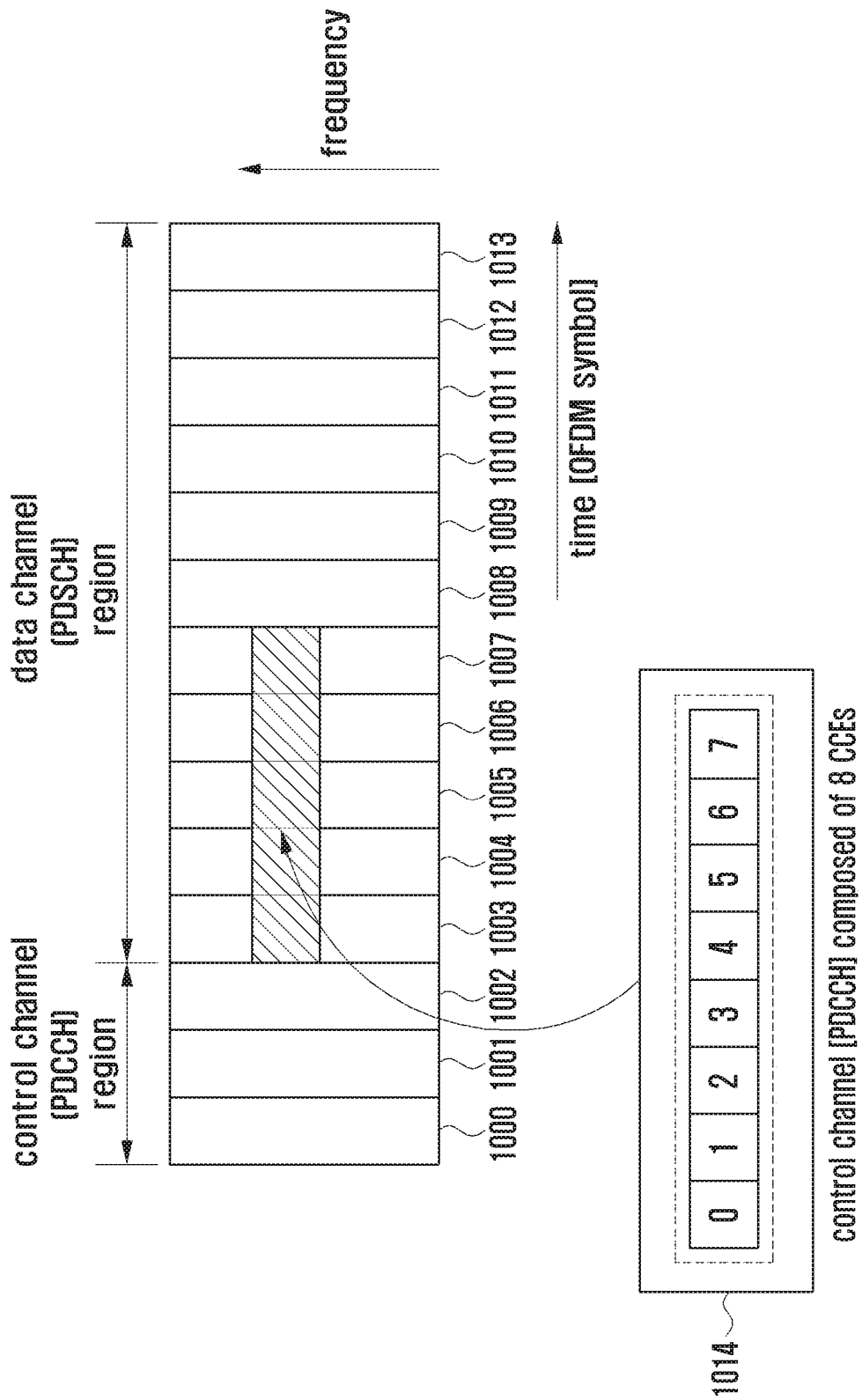
FIG. 11 is a diagram illustrating a method for transmitting/receiving the control channel using a part of the data channel region in a subframe according to another embodiment of the present invention.

FIG. 11 is a diagram illustrating a method for transmitting/receiving the control channel using a part of the data channel region in a subframe according to another embodiment of the present invention.

FIG. 11 shows another exemplary case of transmitting control channel using a part of the data channel region, and the base station transmits the control channel 1114 on the 5 OFDM symbols 1103 to 1107 at the beginning of the data channel region.

In order to receive control channel, the user equipment checks the first 5 symbols of the data channel region to determine whether the control channel 1114 destined to itself is carried therein. If there is not data allocation information, the user equipment enters the micro sleep mode for the rest 5 OFDM symbols 1108 to 1113 to reduce the power consumption. Here, the number of OFDM symbols of the data channel region that are allocated for transmitting the control channel can be changed. The base station notifies the corresponding user equipment of the information on the data channel region for transmitting the control channel via higher layer signaling.

Figure 12:
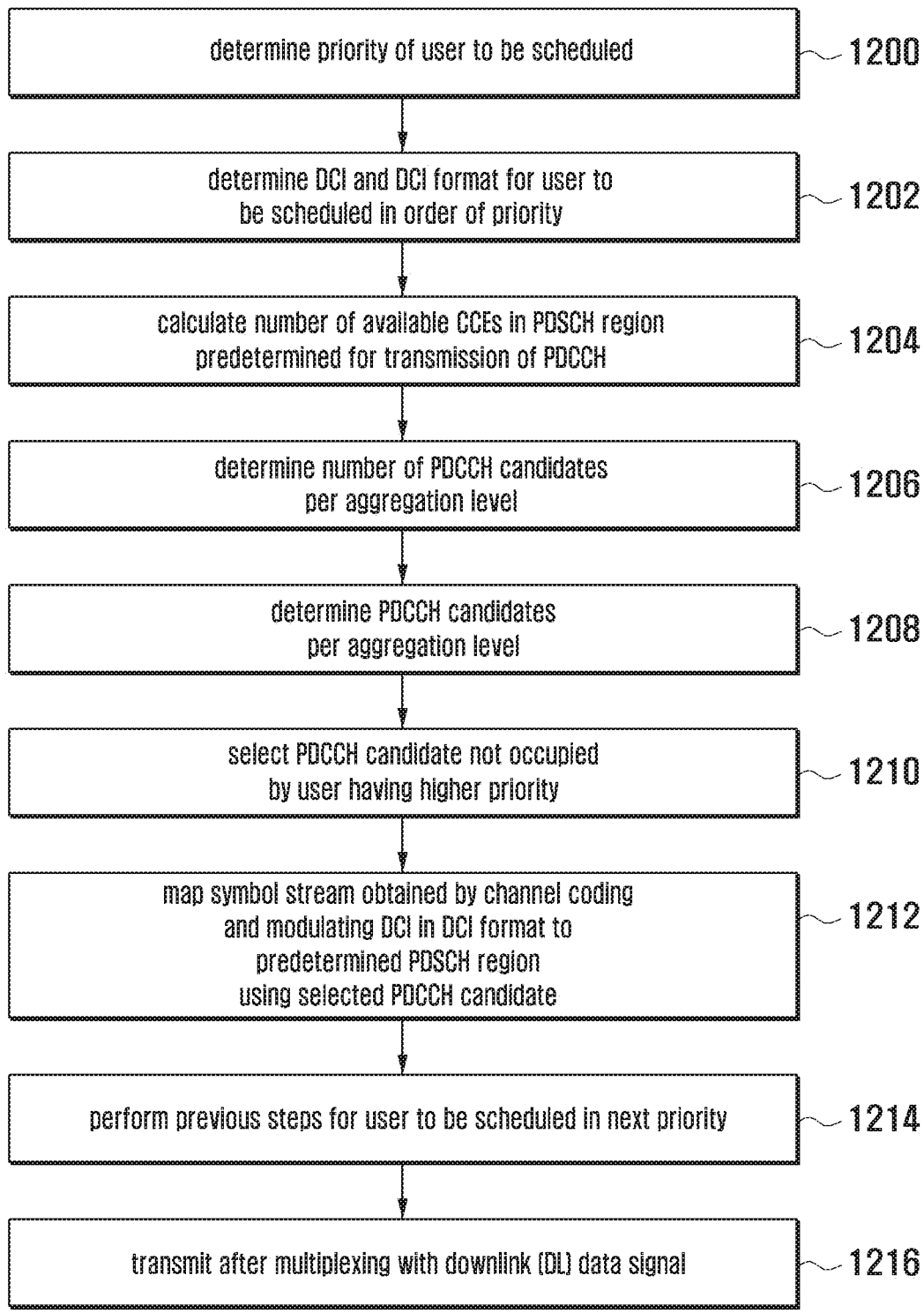
FIG. 12 is a flowchart illustrating a method for transmitting control channel using the data channel region according to an embodiment of the present invention.

FIG. 12 is a flowchart illustrating a method for transmitting control channel using the data channel region according to an embodiment of the present invention.

Referring to FIG. 12, the base station determines the priorities of the users to be scheduled at step 1200. Next, the base station determines the control information and the control information formats of the users scheduled in order of priority at step 1202. In order to implement the method for transmitting the control channel using a part of the data channel region, the base station calculates a number of CCEs available as a part of the predetermined dada channel region at step 1204. Next, the base station determines a number of control channel candidate per AL at step 1206 and then determines the control channel candidates group by applying the value (number of control channel candidates) to the hash function at step 1208. Once the control channel candidates group is determined, the base station selects the control channel candidate which is not preoccupied by the user having a higher priority as the control channel candidate of the corresponding user at step 1210. Next, the base station performs channel coding and modulation on the control information into a symbol stream using the previously (step 1208) selected control channel candidate and maps the symbol stream to the predetermined data channel region at step 1212. At this time, the predetermined data channel region can be formed on all or some of the symbols in the data channel region. This is the same as described with reference to FIGS. 10 and 11. That is, the control channel can be transmitted using all or some of the symbols of the data channel region.

According to an embodiment of the present invention, the base station can map the control information to the data channel region in distributed type at step 1212 so as to obtain frequency diversity gain.

The base station repeats steps 1204 to 1212 to the users scheduled in order of priority so as to map the control channels of the scheduled users to transmission resources. Next, the base station transmits the control channel as multiplexed with the downlink data signal at step 1216.

Figure 13:
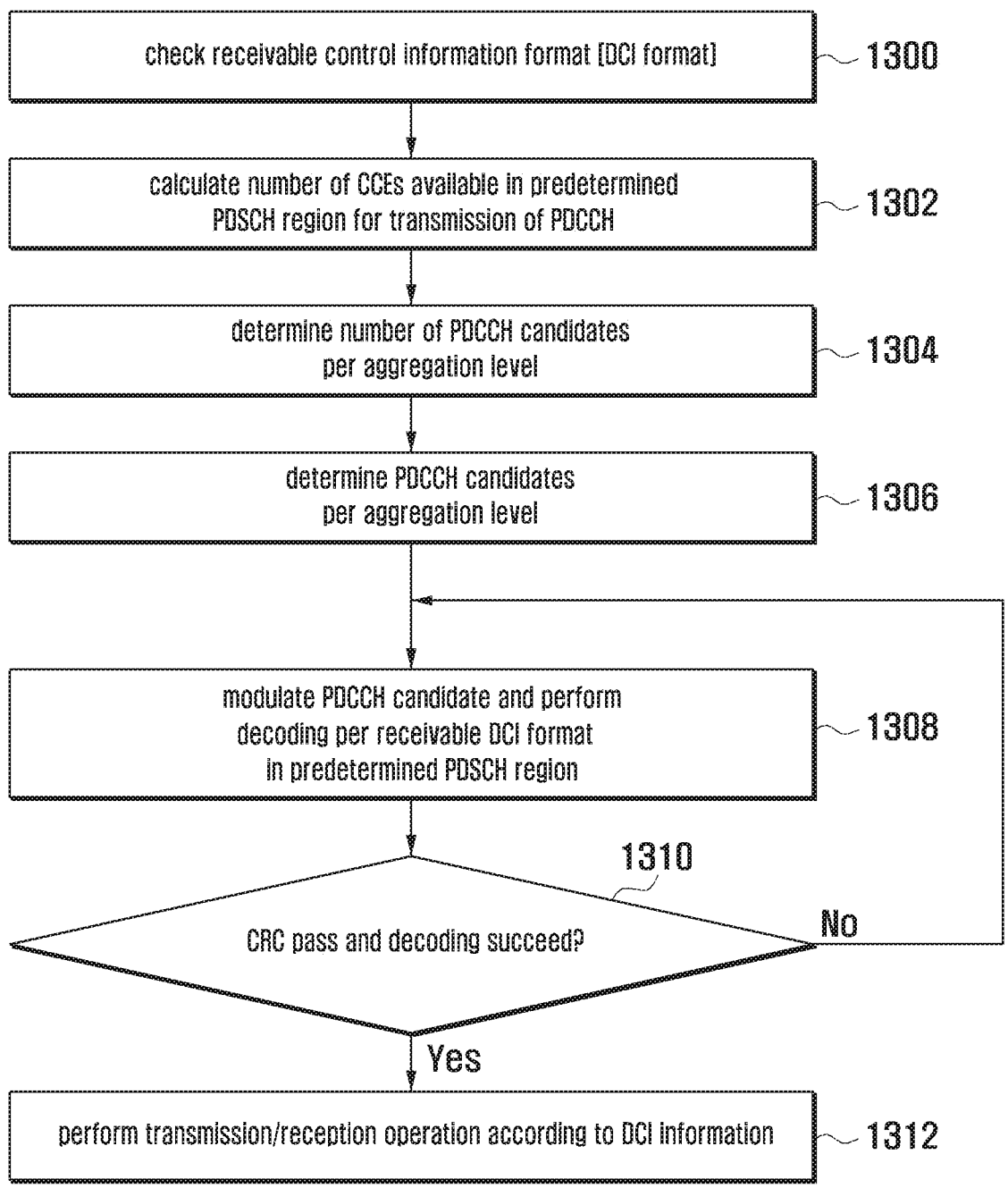
FIG. 13 is a flowchart illustrating a method for the user equipment to receive the control channel transmitted in data channel region according to an embodiment of the present invention.

A description is made of the method for the user equipment to receive the control channel transmitted over all or some of the symbols of the data channel region as described above. FIG. 13 is a flowchart illustrating a method for the user equipment to receive the control channel transmitted in data channel region according to an embodiment of the present invention.

Referring to FIG. 13, each user equipment checks the receivable control information formats at step 1300. The receivable control information formats are preset via higher layer signaling.

Next, the user equipment calculates a number of CCEs available for transmitting the control channel in some of the predetermined data channel region at step 1204. Next, the user equipment determines a number of control channel candidates per AL at step 1304 and then determines the control channel candidates group per AL by applying the value (number of control channel candidates) to the hash function at step 1306.

Next, the user equipment performs demodulation on the control channel candidates in the predetermined data channel region and then performs channel decoding with receivable control information formats at step 1308. The user equipment performs CRC to determine whether the decoding is successfully, at step 1310. If the decoding fails, the user equipment repeats steps 1308 and 1310 on the other control channel candidates determined at step 1306. If the decoding fails to all of the control channel candidates, this means that there is not control channel transmitted to the corresponding user. If the decoding is successful at step 1310, the user equipment locates the transmission resource allocated itself by referencing the control information acquired on the control channel decoded successfully (successful CRC operation) and performs transmission/reception operating on the transmission resource allocated to itself.

Fourth Embodiment: Control Channel Transmission Using Control Channel Candidate Group Extended Over the Control Channel Region and Data Channel Region FIG. 14 is a diagram illustrating a method for transmitting/receiving control channel using both the control and data channel regions according to an embodiment of the present invention.

Figure 14:
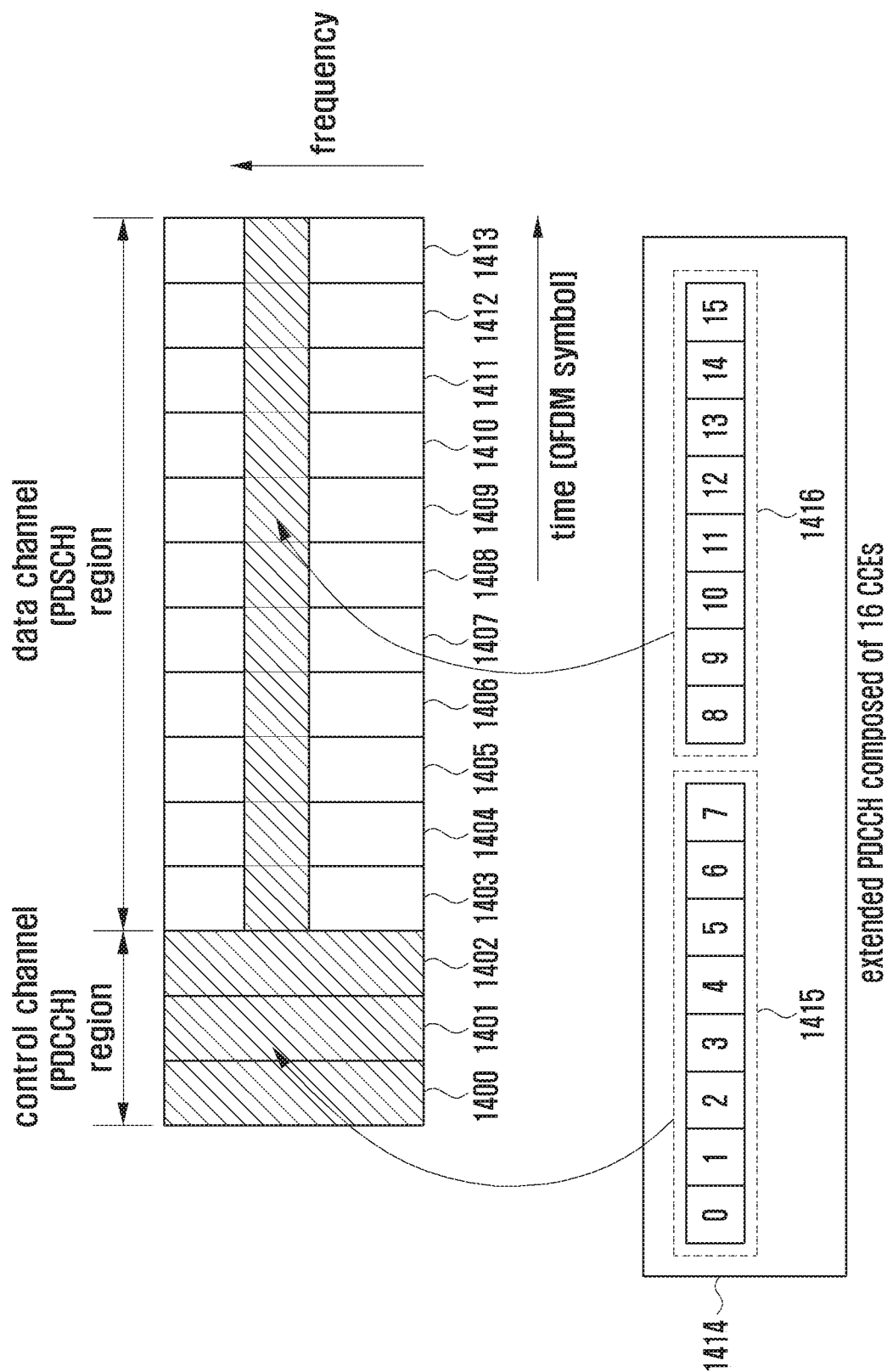
FIG. 14 is a diagram illustrating a method for transmitting/receiving control channel using both the control and data channel regions according to an embodiment of the present invention.

In FIG. 14, the transmission resource is divided into the control channel region composed of 3 symbols 1400 to 1402 and the data channel region composed of 11 symbols 1403 to 1413 in time domain.

Referring to FIG. 14, the base station transmits the extended control channel 1414 on the control channel region of the symbols 1400 to 1402 and the data channel region of symbols 1403 to 1413 in a subframe. Here, the extended control channel 1414 is composed of 16 CCEs.

The eight CCEs 1415 at the first half of the extended control channel 1414 is transmitted in parts of three OFDM symbols 1400 to 1402 at the beginning of the subframe. Also, the eight CCEs 1416 at the last half of the extended control channel 1414 is transmitted on predetermined frequency region (subcarriers) in the rest 11 OFDM symbols 1403 to 1413 of the subframe. The base station notifies the corresponding user equipment with the designation information of specific user equipments receiving the control channel using the above described method, information on the extended control channel candidate group, and the number of subframes used for transmitting the extended control channel via higher layer signaling. In FIG. 14, the number of CCEs constituting an extended control channel can be changed.

Figure 15:
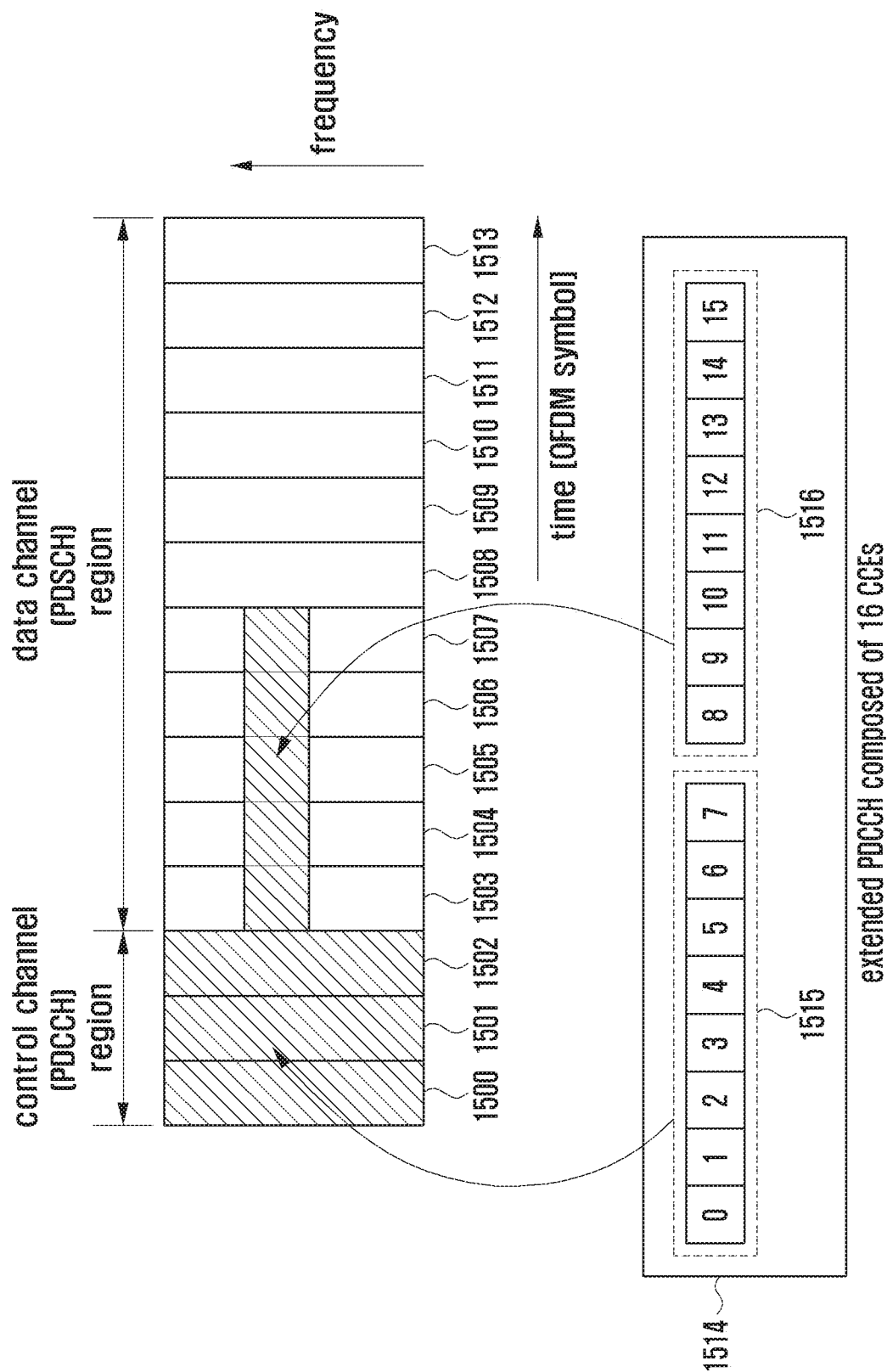
FIG. 15 is a diagram illustrating a method for transmitting/receiving control channel using both the control and data channel regions according to another embodiment of the present invention.

FIG. 15 is a diagram illustrating a method for transmitting/receiving control channel using both the control and data channel regions according to another embodiment of the present invention.

In FIG. 15, the transmission resource is divided into the control channel region composed of 3 symbols 1500 to 1502 and the data channel region composed of 11 symbols 1503 to 1513 in time domain.

Referring to FIG. 15, the base station transmits the extended PDCCH 1514 on the conventional control channel region of the symbols 1500 to 1502 and some parts of the data channel region of symbols 1503 to 1513 in a subframe. Here, the extended control channel 1514 is composed of 16 CCEs.

The 8 CCEs 1515 at the first half of the extended control channel 1514 is transmitted in some parts of the three OFDM symbols 1500 to 1502 at the beginning of the subframe. Also, the 8 CCEs 1516 at the last half of the extended control channel 1514 is transmitted on the predetermined frequency region (subcarriers) of 5 OFDM symbols 1503 to 1507 in the data channel region.

The base station notifies the corresponding user equipment with the designation information of specific user equipment receiving the control channel using the above described method, information on the extended control channel candidate group, and the number of subframes used for transmitting the extended control channel via higher layer signaling. In FIG. 15, the number of CCEs constituting an extended control channel and the number of OFDM symbols used for the control channel transmission can be changed. The reason why only a part at the beginning of the data channel region is used for the control channel transmission is to reduce the power consumption of the user equipment as described above.

Figure 16:
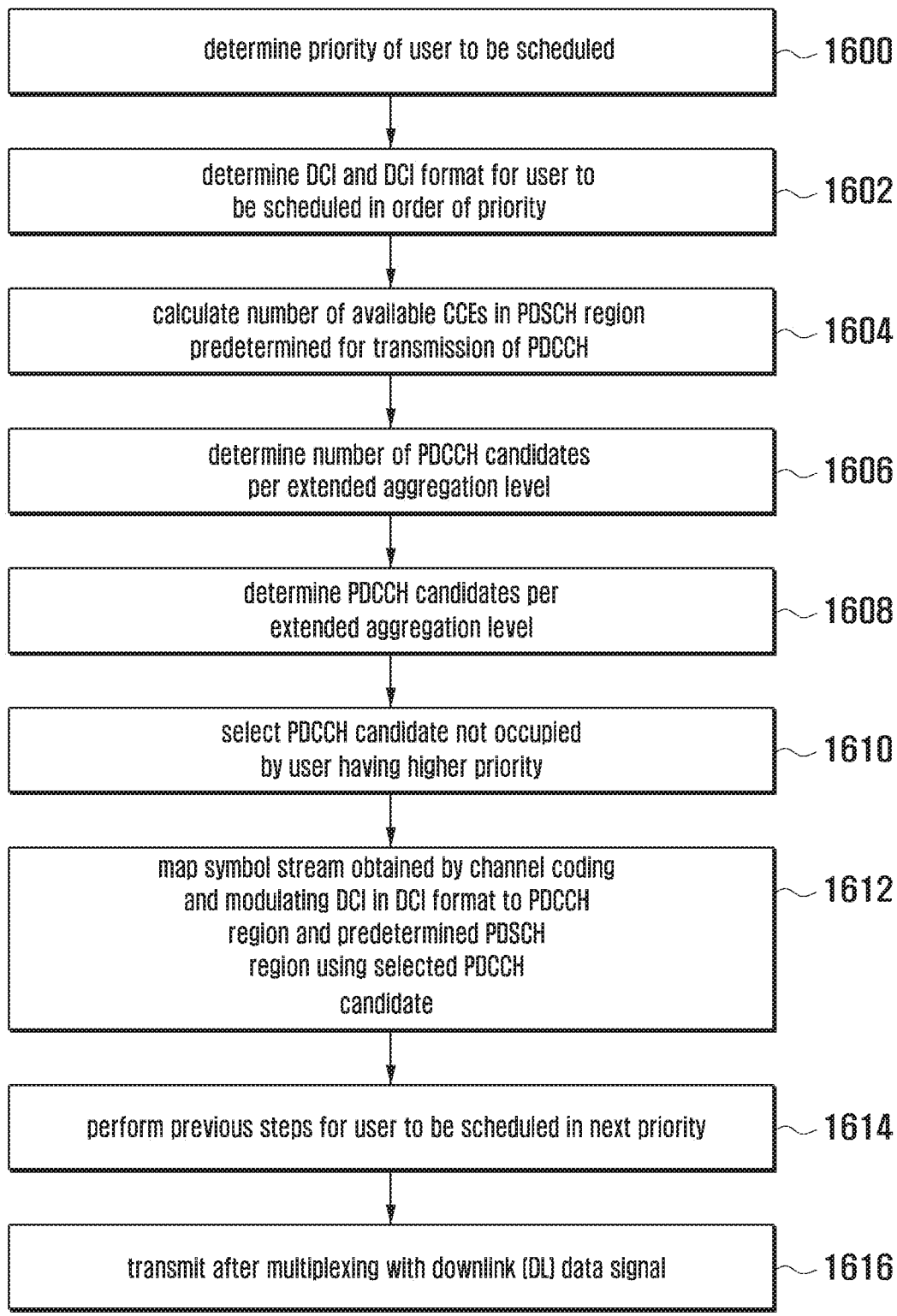
FIG. 16 is a flowchart illustrating a method for transmitting control channel using both the control and data channel regions according to an embodiment of the present invention.

FIG. 16 is a flowchart illustrating a method for transmitting control channel using both the control and data channel regions according to an embodiment of the present invention.

Referring to FIG. 16, the base station determines priorities of the users to be scheduled at step 1600. Next, the base station determines the control information of the user and the control information format in order of priority of the user at step 1602.

In order to implement the method for transmitting the control channel using the extended control channel candidates with a part of the data channel region, the base station calculates a number of CCEs available for transmitting the control channel in further consideration of a part of the predetermined data channel region at step 1604. The base station determines a number of control channel candidates per extended AL proposed in the present invention at step 1606. At this time, the maximum AL is determined based on the predetermined amount of data channel resource for transmitting control channel. Next, the base station determines the extended control channel candidate group by applying the number of control channel candidates at step 1608. Once the control channel candidate group is determined, the base station selects a control channel candidate which is not preoccupied by a user having a higher priority as the control channel candidate of the corresponding user at step 1610. Next, the base station performs channel coding and modulation on the control information in the control information format into the modulated symbol stream and maps the symbol stream to the control and data channel regions using the selected control channel candidate at step 1612. At step 1612, the base station maps the control information to the data channel region such that the resource blocks are transmitted in distributed manner as described with reference to step 1212 of FIG. 12.

At this time, the predetermined data channel region can be a formed across all or some of the symbols of the data channel region. This is the same as described with reference to FIGS. 14 and 15. That is, the control channel transmitted in the data channel region can be mapped in all or some of the symbols of the data channel region.

Next, the base station repeats steps 1604 to 1612 to the user having the next higher priority until the control channels of all the scheduled users are mapped to the transmission resource at step 1614. Finally, the base station transmits the control channels as multiplexed with the downlink data signals at step 1616.

Figure 17:
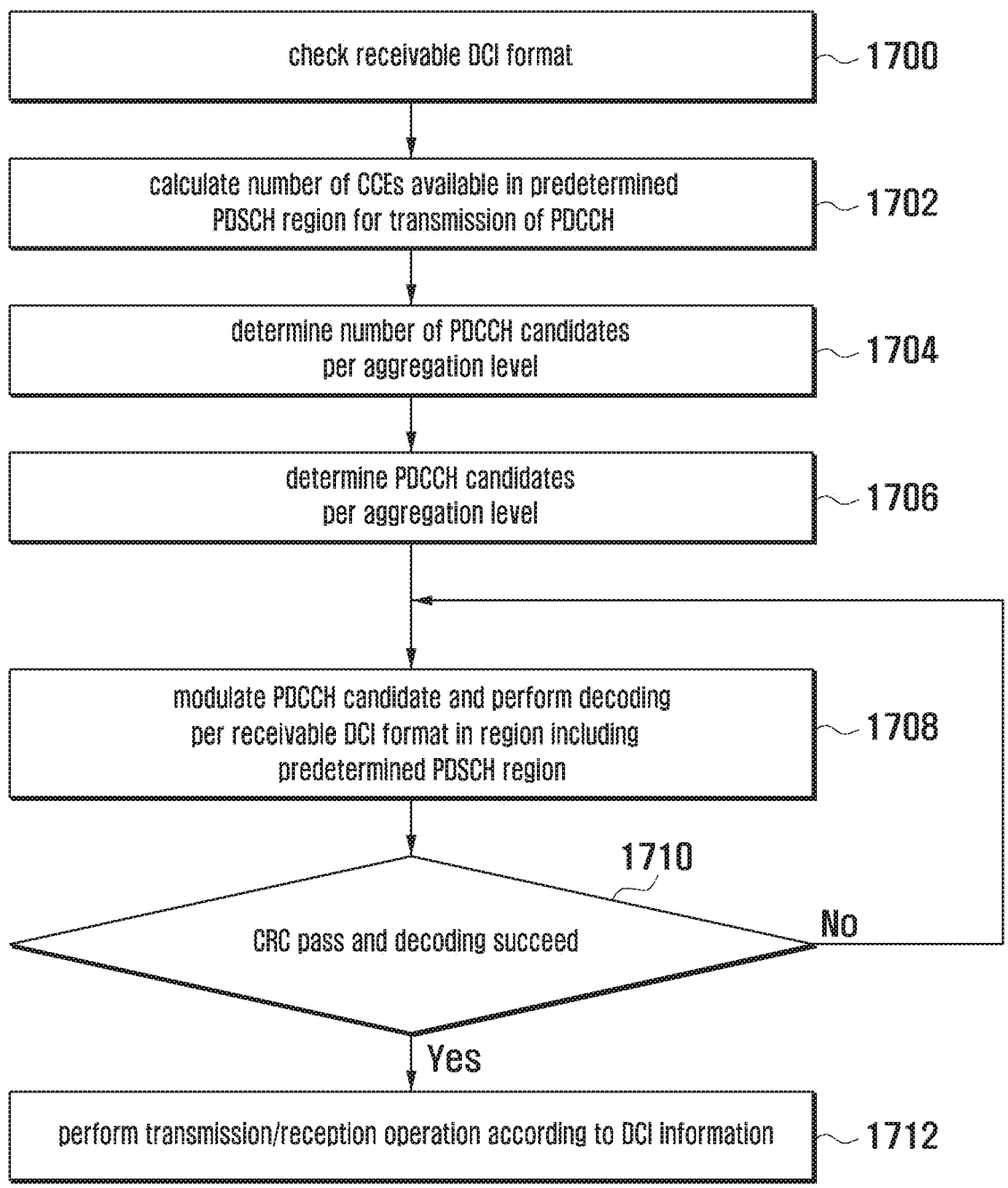
FIG. 17 is a flowchart illustrating a method for a user equipment to receive the control channel transmitted in both the control and data channel regions using the extended control channel candidate group according to an embodiment of the present invention.

A description is made of a method for receiving the control channel transmitted on both the control and data channel regions as described above. FIG. 17 is a flowchart illustrating a method for a user equipment to receive the control channel transmitted in both the control and data channel regions using the extended control channel candidate group according to an embodiment of the present invention.

Referring to FIG. 17, each user equipment checks the receivable control information formats at step 1700. The receivable control information formats are preset via higher layer signaling. Next, the base station calculates a number of CCEs available in the predetermined data channel region as described with reference to step 1606 of FIG. 16 at step 1702. Next, the base station determines a number of control channel candidates per extended Al at step 1704 and then determines the control channel candidate group per extended AL by applying the value (number of control channel candidates) to the hash function at step 1706. Next, the user equipment performs demodulations on the control channel region and a predetermined part of the data channel region channel and then performs decoding for the receivable control channel formats at step 1708. The user equipment performs CRC to determine whether the decoding is successful at step 1710. If the decoding fails, the user equipment repeats steps 1708 and 1710 to the other control channel candidates. If the decoding fails on all the control channel candidates, this means that there is no control channel destined to the corresponding user. Otherwise, if the decoding succeeds at step 1710, the user equipment locates the transmission resource allocated to itself based on the control information obtained by decoding the control channel (successful CRC operation) and performs transmission/reception operation on the transmission resource allocated to itself at step 1712.

As described with reference to FIG. 17, when it is impossible to use the extended control channel candidate group, the control channel can be transmitted/received repeatedly in a predetermined part of the data channel region using the control channel candidate group. That is, the same control channel can be transmitted in the control and data channel regions repeatedly. In the embodiment of FIG. 14, the first 8 CCEs 1415 of the control channel 1414 transmitted in a part of the 3 OFDM symbols 1400 to 1402 at the beginning of the subframe as the control channel region and the last 8 CCEs 1416 transmitted in a predetermined frequency region of the 11 OFDM symbols 1403 to 1413 can be the same control channel. Also, in the embodiment of FIG. 15, the first 8 CCEs transmitted at a part of the first 3 OFDM symbols 1500 to 1502 of the subframe as the control channel region and the last 8 CCEs 1516 transmitted on a predetermined frequency region in 5 OFDM symbols 1503 to 1507 as a part of the data channel region can be the same control channel.

The configurations of the base station and the user equipment for transmitting/receiving control channels according to an embodiment of the present invention are described hereinafter.

Figure 18:
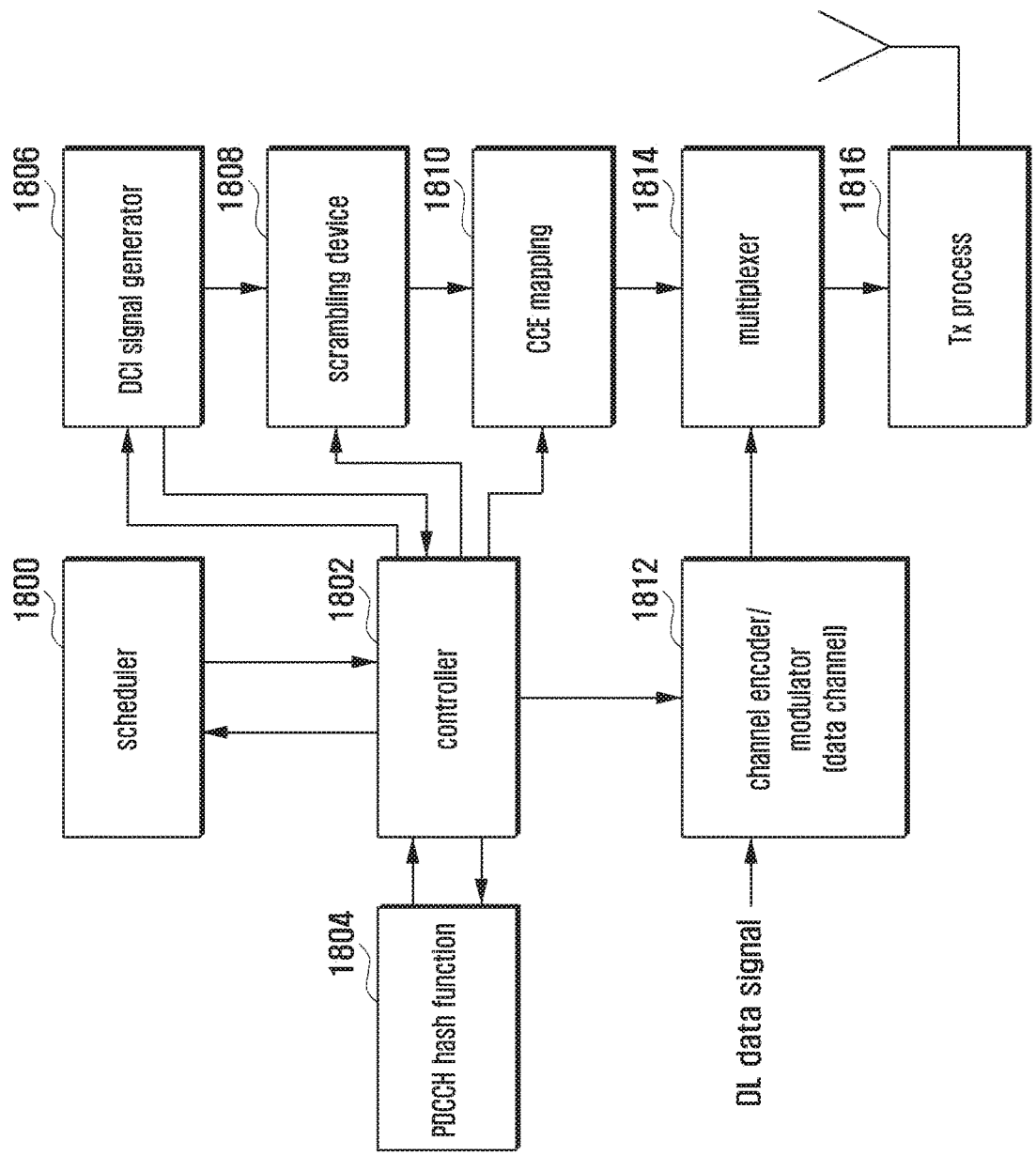
FIG. 18 is a block diagram illustrating a configuration of a base station for transmitting control channel in a wireless communication system according to an embodiment of the present invention.

First of all, a description is made of the configuration of a base station for transmitting the control channel in a wireless communication according to an embodiment of the present invention. FIG. 18 is a block diagram illustrating a configuration of a base station for transmitting control channel in a wireless communication system according to an embodiment of the present invention.

The base station according to an embodiment of the present invention includes a scheduler 1800, a controller 1802, a PDCCH hash function device 1804, a DCI signal generator 1806, a scrambler 1808, a CCE mapper 1810, a channel encoder/modulator 1812, a multiplexer 1814, and a Tx processor 1816.

The scheduler 1800 transmits control channel (PDCCH) to a certain user (equipment) to inform of allocation of downlink (DL) resource and uplink (UL resource and performs scheduling by assigning priorities to users. At this time, the scheduler 1800 performs scheduling as described above base on the channel condition reported by each user (equipment).

The control unit 1802 controls operations of the function blocks 1804 to 1816 according the scheduling of the scheduler 1800. At this time, the determination of the scheduler 1802 can be updated according to the determination of the controller 1802.

The hash function device 1804 receives a number of available CCEs and a number of PDCCHs from the controller 1802, determines a control channel candidate based on these values, and returns the determined value to the controller 1802. The controller 1802 selects a control channel candidate which is not occupied by other user equipment having higher priority as the control channel of the corresponding user equipment.

Meanwhile, the controller 1802 generates DCI of the user equipment according to the scheduling result of the scheduler 1800.

The control information generator 1806 generates the DCI under the control of the controller 1802.

The scrambler 1808 performs scrambling on the control information with the identifier of the subframe in which the data channel indicating the control information of the corresponding user equipment is transmitted. That is, when the control channel is transmitted in at least two subframes, the scrambler 1808 performs scrambling the control information using the identifier of the last subframe.

The CCE mapper 1810 maps the control information to the control channel selected by the controller 1802 among the control channel candidates determined by the hash function device 1804.

The controller 1802 controls the CCE mapper 1810 to map the control channel to the control channel transmission region. The control channel can be mapped to the control channel regions of plural subframes as described with reference to FIG. 4, an extended control channel is mapped to the control channel regions of plural subframes as described with reference to FIG. 7. Also, the control channel can be mapped to the data channel region as described with reference to FIGS. 10 and 11. Furthermore, the control channel can be mapped to the control and data channel regions as described with reference to FIGS. 14 and 15.

Meanwhile, the encoder/modulator 1812 performs encoding and modulation on the downlink data to generate data channel. The multiplexer 1814 multiplexes the encoded and modulated data channel and control channel into downlink signals. The transmitter 1816 transmits the downlink signals.

A procedure proposed in the present invention is performed by the controller 1802, the hash function device 1804, the scrambler 1808, and CCE mapper 1810.

The controller 1802 knows the control channel resource or data channel resource of a plurality of subframes as the additional resource for use in control channel transmission in advance and determines whether to configure the extended control channel candidates group or the conventional control channel candidates group according to how to us the additional resource. Once the additional control resource and how to use the control resource are determined, the controller 1802 controls the scheduler 1800 to use the additional resource for control channel transmission and, when using the extended control channel candidate group, provides this information to the hash function device 1804 to determine the extended control channel candidate from the extended control channel candidate group.

In case of transmitting the control channel using plural subframes, the scrambler 1808 performs scrambling with the number of subframe carrying the corresponding data which is input by the controller 1802.

The controller 1802 can provide the CCE mapper 1810 with the information on the control channel region and the data channel region determined for control channel transmission. The CCE mapper 1810 maps the control channel to the corresponding region according to the information received from the controller 1802.

Figure 19:
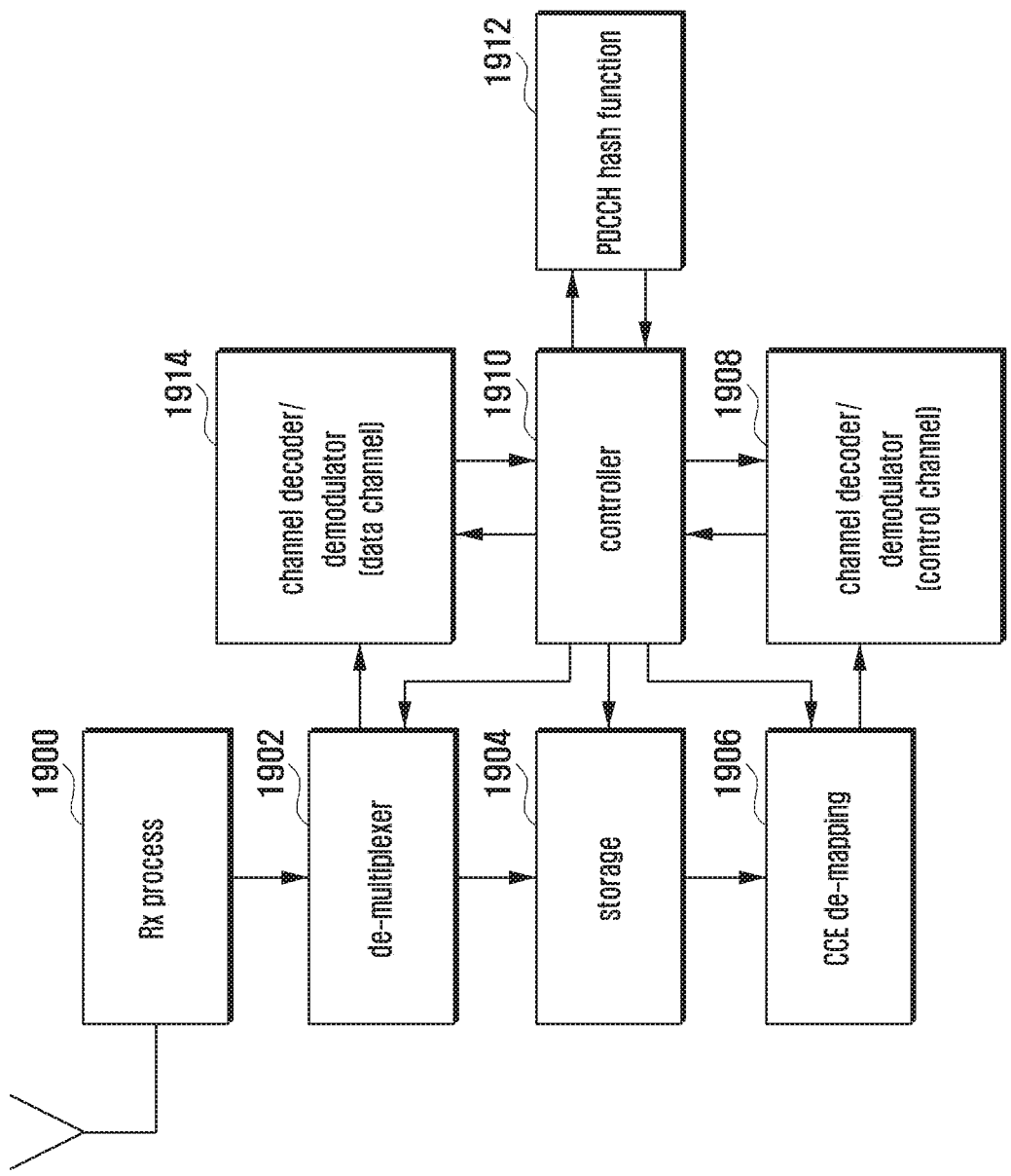
FIG. 19 is a block diagram illustrating a configuration of a user equipment for receiving control channel in a wireless communication according to an embodiment of the present invention.

A description is made of the configuration of a user equipment for receiving the control channel in a wireless communication system according to an embodiment of the present invention. FIG. 19 is a block diagram illustrating a configuration of a user equipment for receiving control channel in a wireless communication according to an embodiment of the present invention.

Referring to FIG. 19, the user equipment according to an embodiment of the present invention includes an RX processor 1900, a de-multiplexer 1902, a storage 1904, a CCE de-mapper 1906, a data channel decoder/demodulator 1908, a controller 1910, a hash function device 1912, and a control channel decoder/demodulator 1914.

The receiver 1900 receives the signal transmitted by the base station through an antenna and converts the signal into baseband signal. The de-multiplexer 1902 de-multiplexes the signal received by the means of the receiver into the control channel and the data channel.

The storage 1904 stores the control channel de-multiplexed from the received signal. This is for the method for transmitting the control channel using a plurality of subframes, and the capacity of the storage 1904 is determined under the control of the controller 1910.

The CCE de-mapper 1906 de-maps the control channel received in one or more subframes into control channel candidates. That is, the CCE de-mapper 1906 extracts the control channel from one or more subframes.

The hash function device 1912 receives information on the number of available CCEs and the number of available control channel candidates input by the controller 1910, determines the control channel candidate, and returns the determined value to the controller 1910. The controller 1910 notifies the CCE de-mapper 1906 with the control channel candidates.

The control channel decoder/demodulator 1908 performs demodulation and decoding on the individual control channel candidates de-multiplexed by the CCE de-mapper 1906 and notifies the controller 1910 whether the decoding succeeds.

If the decoding on a specific control channel candidate, the control channel decoder/demodulator 1908 performs channel decoding and demodulation on the next control channel candidate de-multiplexed by the CCE mapper 1906 and notifies the controller 1910 whether the decoding succeeds. That is, the control channel decoder/demodulator 1908 performs CRC and notifies whether the blind decoding succeeds. If the CRC succeeds, this means that the decoding is successful.

If the control channel decoding succeeds, the control channel decoder/demodulator 1908 notifies the controller 1910 of the success of decoding. The controller 1910 determines that where there is the data channel allocated to itself, based on the control information decoded from the control channel. That is, the controller 1910 recognizes the data channel allocated to the user equipment by referencing the control information. If there is the data signal of the corresponding user, the data channel decoder/demodulator 1908 performs demodulation and decoding on the data channel extracted by the de-multiplexer 1902 under the control of the controller 1910.

The procedure proposed in the present invention is performed by the controller 1910, the de-multiplexer 1902, the storage 1904, the CCE de-mapper 1906, the control channel decoder/demodulator 1908, and the hash function device 1912.

The controller 1910 notifies the de-multiplexer 1902 of the resource added for use of transmitting control channel so as to recognize a part of the data channel region that is used for control channel transmission.

In case of using extended control channel candidate group, the controller 1910 provides the hash function device 1912 with this information such that the hash function device 1912 determines the extended control channel candidate in the extended control channel candidate group.

In case of using a plurality of subframes for transmitting control channels, the controller 1910 notifies the storage 1904 of the number of subframes used for control channel transmission such that the storage 1904 can store the control channels transmitted in the plural subframes.

The storage 1904 sends the control channels stored according to the value input by the controller 1910 to the CCE de-mapper 1906. The CCE de-mapper 1906 and the control channel decoder/demodulator 1908 performs de-multiplexing and decoding and demodulation on the control signal of individual control channel candidates (or extended control channel candidates) input by the controller 1910.

As described above, the method according to an embodiment of the present invention secure high energy using the additional time domain resource for transmitting a control channel so as to increases the coverage of the control channel. Accordingly, it is possible to avoid data channel decoding failure caused by the control channel reception failure, resulting in reduction of probability of outage.

The specification and drawings are to be regarded in an illustrative rather than a restrictive sense in order to help understand the present invention. It is obvious to those skilled in the art that various modifications and changes can be made thereto without departing from the broader spirit and scope of the invention as set forth in the appended claims.

What is claimed is:

1. A method performed by a terminal in a wireless communication system, the method comprising:
   receiving, from a base station using a higher layer signaling, a number of symbols associated with a control resource and information associated with a downlink control information (DCI) format, the control resource being associated with the DCI format;
   receiving, from the base station on a physical downlink control channel (PDCCH), DCI based on the information associated with the DCI format and the control resource, wherein the control resource is identified based on the number of symbols and the DCI includes information on resource assignment to be used for data transmission or data reception; and
   performing the data transmission or the data reception based on the information on resource assignment.

2. The method of claim 1,
   wherein the control resource includes a PDCCH candidate, and
   wherein the PDCCH candidate includes at least one control channel element (CCE).

3. The method of claim 2, wherein each of the at least one CCE includes resource element groups (REGs).

4. The method of claim 2, wherein a number of the at least one CCE included in the PDCCH candidate is determined based on an aggregation level.

5. A method performed by a base station in a wireless communication system, the method comprising:
   transmitting, to a terminal using a higher layer signaling, a number of symbols associated with a control resource and information associated with a downlink control information (DCI) format, the control resource being associated with the DCI format;
   generating DCI based on the DCI format, the DCI including information on resource assignment to be used for data transmission or data reception; and
   transmitting, to the terminal on a physical downlink control channel (PDCCH), the DCI through the control resource identified based on the number of symbols.

6. The method of claim 5,
   wherein the control resource includes a PDCCH candidate, and
   wherein the PDCCH candidate includes at least one control channel element (CCE).

7. The method of claim 6, wherein each of the at least one CCE includes resource element groups (REGs).

8. The method of claim 6, wherein a number of the at least one CCE included in the PDCCH candidate is determined based on an aggregation level.

9. A terminal in a wireless communication system, the terminal comprising:
   a transceiver; and
   a controller coupled with the transceiver and configured to:
       receive, from a base station using a higher layer signaling, a number of symbols associated with a control resource and information associated with a downlink control information (DCI) format, the control resource being associated with the DCI format,
       receive, from the base station on a physical downlink control channel (PDCCH), DCI based on the information associated with the DCI format and the control resource, wherein the control resource is identified based on the number of symbols and the DCI includes information on resource assignment to be used for data transmission or data reception, and
       perform the data transmission or the data reception based on the information on resource assignment.

10. The terminal of claim 9,
    wherein the control resource includes a PDCCH candidate, and
    wherein the PDCCH candidate includes at least one control channel element (CCE).

11. The terminal of claim 10, wherein each of the at least one CCE includes resource element groups (REGs).

12. The terminal of claim 10, wherein a number of the at least one CCE included in the PDCCH candidate is determined based on an aggregation level.

13. A base station in a wireless communication system, the base station comprising:
    a transceiver; and
    a controller coupled with the transceiver and configured to:
        transmit, to a terminal using a higher layer signaling, a number of symbols associated with a control resource and information associated with a downlink control information (DCI) format, the control resource being associated with the DCI format,
        generate DCI based on the DCI format, the DCI including information on resource assignment to be used for data transmission or data reception, and
        transmit, to the terminal on a physical downlink control channel (PDCCH), the DCI through the control resource identified based on the number of symbols.

14. The base station of claim 13,
    wherein the control resource includes a PDCCH candidate, and
    wherein the PDCCH candidate includes at least one control channel element (CCE).

15. The base station of claim 14, wherein each of the at least one CCE includes resource element groups (REGs).

16. The base station of claim 14, wherein a number of the at least one CCE included in the PDCCH candidate is determined based on an aggregation level.

* * * * *